(12) United States Patent
Tachibana et al.

(10) Patent No.: US 11,670,436 B2
(45) Date of Patent: Jun. 6, 2023

(54) INSULATED WIRE MATERIAL AND METHOD OF MANUFACTURING THE SAME, AND COIL AND ELECTRICAL/ELECTRONIC EQUIPMENT

(71) Applicant: FURUKAWA ELECTRIC CO., LTD., Tokyo (JP)

(72) Inventors: Akira Tachibana, Tokyo (JP); Daisuke Muto, Tokyo (JP); Hirofumi Oshima, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/816,772

(22) Filed: Mar. 12, 2020

(65) Prior Publication Data

US 2020/0211734 A1 Jul. 2, 2020

Related U.S. Application Data

(63) Continuation of application No. PCT/JP2019/012061, filed on Mar. 22, 2019.

(30) Foreign Application Priority Data

Mar. 30, 2018 (JP) .................................. 2018-067210

(51) Int. Cl.
*H01B 7/08* (2006.01)
*H01R 4/00* (2006.01)
(Continued)

(52) U.S. Cl.
CPC .......... *H01B 7/0838* (2013.01); *H01B 1/026* (2013.01); *H01B 3/427* (2013.01); *H01B 7/40* (2013.01); *H02K 3/28* (2013.01)

(58) Field of Classification Search
CPC ............... H01B 7/08; H01R 4/00; H02G 1/14
See application file for complete search history.

(56) References Cited

U.S. PATENT DOCUMENTS 3,753,185 A * 8/1973 Mahan ..................... G01V 3/15
336/84 R
3,787,607 A * 1/1974 Schlafly ............... H02G 15/085
174/92

(Continued)

FOREIGN PATENT DOCUMENTS

CN 105580089 A 5/2016
CN 107005116 A 8/2017
(Continued)

OTHER PUBLICATIONS

Chinese Office Action and Search Report, dated Jul. 7, 2020, for corresponding Chinese Application No. 201980001882.4, with an English translation of the Chinese Office Action.
(Continued)

*Primary Examiner* — Chau N Nguyen
(74) *Attorney, Agent, or Firm* — Birch, Stewart, Kolasch & Birch, LLP

(57) ABSTRACT

Provided are an insulated wire material including: a conductor including a single core conductor or a plurality of divided conductors placed in parallel to each other or helically placed; a peripheral insulating layer with which a periphery of the conductor is coated; and a welding member provided at least one end portion of the conductor and joined, via a welded portion welded to the single core conductor or divided conductors, to at least a peripheral surface of the welded portion, a manufacturing method thereof, a coil including the insulated wire material, and electrical/electronic equipment including the coil.

32 Claims, 7 Drawing Sheets

(51) Int. Cl.
*H01B 1/02* (2006.01)
*H01B 3/42* (2006.01)
*H01B 7/40* (2006.01)
*H02K 3/28* (2006.01)

(56) References Cited

U.S. PATENT DOCUMENTS

| | | | | |
|---|---|---|---|---|
| 4,836,769 | A * | 6/1989 | Iwabuchi | B01F 13/08 |
| | | | | 428/377 |
| 6,344,616 | B1 * | 2/2002 | Yokokawa | H01B 7/00 |
| | | | | 174/117 F |
| 7,484,998 | B2 * | 2/2009 | Benham | H01R 9/0515 |
| | | | | 439/289 |
| 9,336,930 | B2 * | 5/2016 | Motohara | H01R 43/28 |
| 2004/0041491 | A1 * | 3/2004 | Gorohata | H02K 15/0428 |
| | | | | 310/187 |
| 2008/0190641 | A1 * | 8/2008 | Mertel | H01B 7/0823 |
| | | | | 174/68.1 |
| 2009/0104514 | A1 * | 4/2009 | Lietz | H01B 7/08 |
| | | | | 29/874 |
| 2010/0122479 | A1 * | 5/2010 | Golle | G09F 21/14 |
| | | | | 40/215 |
| 2012/0092117 | A1 * | 4/2012 | Urano | H02K 3/42 |
| | | | | 336/186 |
| 2012/0103686 | A1 | 5/2012 | Sekido et al. | |
| 2013/0025908 | A1 * | 1/2013 | Liu | H01B 7/0009 |
| | | | | 174/113 R |
| 2014/0305679 | A1 * | 10/2014 | Watanabe | C22F 1/08 |
| | | | | 174/11 OR |
| 2015/0255885 | A1 | 9/2015 | Choi | |
| 2015/0357724 | A1 | 12/2015 | Okuno et al. | |
| 2016/0189824 | A1 | 6/2016 | Fukuda et al. | |
| 2016/0307662 | A1 | 10/2016 | Ikeda et al. | |
| 2016/0322126 | A1 | 11/2016 | Oya et al. | |
| 2017/0004900 | A1 | 1/2017 | Ishii et al. | |
| 2017/0346358 | A1 | 11/2017 | Fukuda et al. | |
| 2018/0038836 | A1 | 2/2018 | Nakamura | |
| 2018/0268962 | A1 | 9/2018 | Ikeda et al. | |
| 2018/0358856 | A1 | 12/2018 | Oya et al. | |
| 2020/0212602 | A1 * | 7/2020 | Tachibana | H02K 3/30 |

FOREIGN PATENT DOCUMENTS

| | | | |
|---|---|---|---|
| CN | 107671420 | A | 2/2018 |
| JP | 2008-186724 | * | 8/2008 |
| JP | 2010-218796 | A | 9/2010 |
| JP | 2013-222625 | A | 10/2013 |
| JP | 2014-96319 | A | 5/2014 |
| JP | 2017-98030 | A | 6/2017 |
| KR | 10-1228887 | B1 | 2/2013 |
| KR | 10-2014-0114027 | A | 9/2014 |
| TW | 200933657 | A | 8/2009 |
| TW | 201535423 | A | 9/2015 |
| TW | 201539490 | A | 10/2015 |
| TW | 201546835 | A | 12/2015 |
| TW | 201802831 | A | 1/2018 |
| WO | WO 2011/007674 | A1 | 1/2011 |
| WO | WO 2015/033820 | A1 | 3/2015 |
| WO | WO 2015/033821 | A1 | 3/2015 |

OTHER PUBLICATIONS

International Search Report, issued in PCT/JP2019/012061, PCT/ISA/210, dated Jun. 4, 2019.
Written Opinion of the International Searching Authority, issued in PCT/JP2019/012061, PCT/ISA/237, dated Jun. 4, 2019.
Chinese Office Action for corresponding Chinese Application No. 201980001882.4, dated Dec. 10, 2020, with English translation.
Korean Office Action for corresponding Korean Application No. 10-2019-7029742, dated Apr. 5, 2021, with English translation.
Korean Office Action for corresponding Korean Application No. 10-2019-7029742, dated Oct. 8, 2021, with English translation.

* cited by examiner

INSULATED WIRE MATERIAL AND METHOD OF MANUFACTURING THE SAME, AND COIL AND ELECTRICAL/ELECTRONIC EQUIPMENT

CROSS-REFERENCE TO RELATED APPLICATIONS

This application is a Continuation of PCT International Application No. PCT/JP2019/012061 filed on Mar. 22, 2019, which claims priority under 35 U.S.C. § 119 (a) to Japanese Patent Application No. 2018-067210 filed in Japan on Mar. 30, 2018. Each of the above applications is hereby expressly incorporated by reference, in its entirety, into the present application.

TECHNICAL FIELD

The present invention relates to an insulated wire material and a method of manufacturing the insulated wire material, and a coil and an electrical/electronic equipment.

BACKGROUND ART

In recent years, performance of electrical/electronic equipment has been rapidly improved, and, as an insulated wire for use therein, an insulated wire having a characteristic suitable for its use or the like, such as, for example, an insulated wire having a high radio frequency characteristic, has been demanded.

The insulated wire having the high radio frequency characteristic is, for example, an insulated wire for use in motors (coils) of automobiles. Specifically, electrically driven vehicles equipped with electric motors have been increasingly released from 2010s for environmental protection, such as hybrid electric vehicles (HEVs), plug-in hybrid vehicles (PHEVs), and electric vehicles (EVs). Further, standards of zero emission vehicles (ZEVs) were tightened in 2018 in the state of California that is the largest automobile market in the United States of America, and (fuel-efficient) engine vehicles and HEVs were excluded from ZEVs. Therefore, countermeasures for ZEVs will be really required from 2020s. In order to be authorized as ZEVs, an internal-combustion engine cannot be used as a drive system. Therefore, it is considered that a drive motor will be required to have performance equivalent to that of the internal-combustion engine and to have higher power. In order to improve power in the drive motor or the like, a so-called flat wire having a rectangular cross-sectional shape is used more generally than a so-called round wire having a circular cross-sectional shape. Further, in order to improve the radio frequency characteristic of the drive motor or the like in a high rotation area, a winding wire having low eddy current loss is required. Generally, in a case in which an insulated wire including a conductor that is formed by a plurality of element wires (enameled wires) including conductor insulating layers on peripheries thereof is used as a winding wire of a coil or the like, eddy current loss can be reduced (for example, Patent Literatures 1 to 4). Further, in order to improve performance of the motor or the like, it is effective in improving heat resistance of the insulated wire, and, for example, there is proposed a high heat-resisting insulated wire in which a layer made from heat-resisting resin such as polyetheretherketone (PEEK) (melting point of 343° C.) is placed as an outermost layer. In a case of such the insulated wire including the outermost layer made from heat-resisting resin, a conductor insulating layer is also required to have high heat resistance.

CITATION LIST

Patent Literatures

Patent Literature 1: JP-A-2014-96319 ("JP-A" means unexamined published Japanese patent application)
Patent Literature 2: WO 2015/033820 A1
Patent Literature 3: WO 2015/033821 A1
Patent Literature 4: JP-A-2017-98030

SUMMARY OF INVENTION

Technical Problem

When a coil for electrical/electronic equipment is prepared, and, in addition, when the coil is, for example, provided in electrical/electronic equipment, end portions of an insulated wire that has been subjected to coil processing if necessary or an end portion thereof and a terminal or the like are electrically and directly connected generally by TIG welding (Tungsten Inert Gas welding).

Such electrical connection is also performed with respect to an insulating wire for use in electrical/electronic equipment whose performance has been rapidly improved in recent years without exception. The insulated wire encompasses an insulated wire including, as an outermost layer, a peripheral insulating layer made from high heat-resisting resin having a glass transfer temperature of 200° C. or more, such as, for example, polyetherimide resin (see Patent Literatures 2, 4, and the like). Further, the insulated wire also encompasses an insulated wire including a conductor that is formed by bundling a plurality of divided conductors including conductor insulating layers (also referred to as "collective conductor"). The end portion of the collective conductor includes not only the insulating layer placed as the outermost layer of the insulated wire but also the conductor insulating layers with which the divided conductors constituting the collective conductor are coated (the conductor insulating layers exist between the divided conductors).

In a case in which the insulated wire is TIG-welded to a terminal or the like, blowholes and soot are generated or remain in a welded portion to be formed because of resin from which those insulating layers are made. Therefore, an end portion of the insulated wire is not easily welded to the terminal or the like, and, even if the end portion can be welded, welding strength thereof is insufficient (welding workability with the terminal or the like is inferior). Such defective welding is further remarkable especially in a case in which the above-mentioned insulated wire for electrical/electronic equipment whose performance has been improved is used and in a case in which a copper conductor made from copper that is one of metal materials that cannot be easily welded is used.

The present invention is contemplated for providing insulated wire material that shows excellent welding workability between an insulated wire including a conductor including a peripheral insulating layer and a terminal or the like and can be electrically connected by TIG welding and providing a manufacturing method thereof. Further, the present invention is contemplated for providing insulated wire material that can reduce eddy current loss when the insulated wire material is used as a winding wire of a coil, has excellent welding workability with an end portion of the insulated wire material, a terminal, or the like, and can be electrically connected by TIG welding and providing a manufacturing method thereof. Furthermore, the present invention is contemplated for providing a coil including the insulated wire material and electrical/electronic equipment including the coil.

Solution to Problem

The inventors of the present invention found that, in an insulated wire including a peripheral insulating layer and a conductor, by fiber-laser welding an end portion of the insulated wire to another end portion of the insulated wire or the end portion to a welding member by a specified method in advance, it is possible to restrain blowholes and soot from being generated and remaining and weld (connect) the welding member to a peripheral surface side of a welded portion to be formed. The inventors of the present invention further found that, when the end portion of the insulated wire and a portion to be welded of the welding member are welded as described above, it is possible to restrain blowholes and soot from being generated and remaining and firmly weld the end portion of the insulated wire and the welding member in a case in which conductor insulating layers are made from high heat-resisting resin and also in a case in which a plurality of insulated wires is used. The inventors of the present invention still further found that, by interposing this welding member, desired TIG welding can be performed with respect to the terminal or the like.

Further, the inventors of the present invention found that, in an insulated wire including: a conductor including a plurality of element wires (divided conductors) each of which includes a conductor insulating layer; and a peripheral insulating layer, by fiber-laser welding, to an end portion of the conductor, a welding member to be welded to another end portion of the insulated wire, a terminal, or the like by a specified method in advance, it is possible to restrain blowholes and soot from being generated and remaining and weld (connect) the welding member to a peripheral surface side of a welded portion to be formed. The inventors of the present invention further found that, when end surfaces of the divided conductors and a portion to be welded of the welding member are welded to connect the conductor and the welding member as described above, it is possible to restrain blowholes and soot from being generated and remaining and firmly weld the end portion of the conductor and the welding member also in a case in which the conductor insulating layers are made from high heat-resisting resin, while maintaining reduction in eddy current loss. The inventors of the present invention still further found that, by interposing this welding member, TIG welding can be performed with respect to the terminal or the like.

The present inventors have further continued research based on this finding, and have completed the present invention.

That is, the above-described problems of the present invention can be solved by the following means.

[1]
An insulated wire material, including:
one or a plurality of insulated wires including a conductor including a single core conductor and a peripheral insulating layer with which a periphery of the conductor is coated; and
a welding member provided at at least one end portion of the insulated wire and joined, via a welded portion welded to the single core conductor, to at least a peripheral surface of the welded portion.

[2]
The insulated wire material described in the above item [1], in which the conductor includes a conductor insulating layer with which a peripheral surface of the single core conductor is coated.

[3]
An insulated wire material, including:
a conductor including a plurality of divided conductors placed in parallel to each other or helically placed and a conductor insulating layer sandwiched between the divided conductors;
a peripheral insulating layer with which a periphery of the conductor is coated; and
a welding member provided at at least one end portion of the conductor and joined, via a welded portion welded to the divided conductors, to at least a peripheral surface of the welded portion.

[4]
The insulated wire material described in any one of the above items [1] to [3], in which the single core conductor or the divided conductors are flat conductors.

[5]
The insulated wire material described in the above item [3] or [4], in which each of the plurality of divided conductors is a ribbon wire.

[6]
The insulated wire material described in any one of the above items [3] to [5], in which
each of the plurality of divided conductors is an enameled wire having a conductor insulating layer with which a peripheral surface thereof is coated, and
the conductor is a flat molded body of strand wires including the enameled wires.

[7]
The insulated wire material described in any one of the above items [1] to [6], in which a material of the single core conductor or the divided conductors is oxygen-free copper.

[8]
The insulated wire material described in any one of the above items [1] to [7], in which a material of the welding member is oxygen-free copper.

[9]
The insulated wire material described in the above item [7] or [8], in which the welded portion contains a tin element.

[10]
The insulated wire material described in any one of the above items [1] to [9], in which tensile strength of the welded portion is equal to or more than 300 MPa.

[11]
The insulated wire material described in any one of the above items [1] to [10], in which the peripheral insulating layer is a layer made from polyetheretherketone.

[12]
The insulated wire material described in any one of the above items [2] to [11], in which the conductor insulating layer is an insulating layer made from organic polymers.

[13]
The insulated wire material described in any one of the above items [2] to [12], in which the conductor insulating layer is an insulating layer having cells.

[14]
The insulated wire material described in any one of the above items [1] to [13], in which an area ratio $[S^{c1}:S^{c2}]$ of a cross-sectional area $S^{c1}$ of the welding member before welding to a cross-sectional area $S^{c2}$ of the conductor before welding satisfies a range of 1:0.8 to 1.2.

A coil including the insulated wire material described in any one of the above items [1] to [14]

[16]

A coil including a plurality of pieces of the insulated wire material described in any one of the above items [1] to [14], in which welding members of the pieces of the insulated wire material are electrically connected to each other.

[17]

An electrical/electronic equipment, including the coil described in the above items [15] or [16].

[18]

A method of manufacturing the insulated wire material described in any one of the above items [1] to [14], including in a state in which an end surface of the conductor and a portion to be welded of the welding member abut against each other, irradiating the portion to be welded with fiber lasers in a thickness direction of the portion to be welded and welding the end surface and the welding member.

Effects of Invention

Insulated wire material of the present invention includes a welding member provided at an end portion of an insulated wire and joined, via a welded portion welded to a single core conductor, to at least a peripheral surface of the welded portion and therefore has excellent welding workability with a terminal or the like and can be electrically connected by TIG welding. Further, a coil including the insulated wire material of the present invention and electrical/electronic equipment including the coil can achieve high performance because pieces of the insulated wire material or the insulated wire material and the terminal or the like can be firmly and electrically welded (connected). Further, according to a method of manufacturing the insulated wire material of the present invention, it is possible to manufacture the insulated wire material of the present invention having the above-mentioned excellent characteristics.

Insulated wire material of the present invention includes a welding member provided at an end portion of a conductor and joined, via a welded portion welded to divided conductors, to at least a peripheral surface of the welded portion and therefore has excellent welding workability with a terminal or the like and can be electrically connected by TIG welding, while maintaining reduction in eddy current loss when the insulated wire material is used as a winding wire of a coil. Further, in a coil including the insulated wire material of the present invention and the electrical/electronic equipment including the coil, the pieces of the insulated wire material or the insulated wire material and the terminal or the like can be firmly and electrically welded (connected), and, in addition, the coil and the electrical/electronic equipment have low eddy current loss and can achieve high performance.

Other and further features and advantages of the invention will appear more fully from the following description, appropriately referring to the accompanying drawings.

MODE FOR CARRYING OUT THE INVENTION

[[Insulated Wire Material]]

Figure 1:
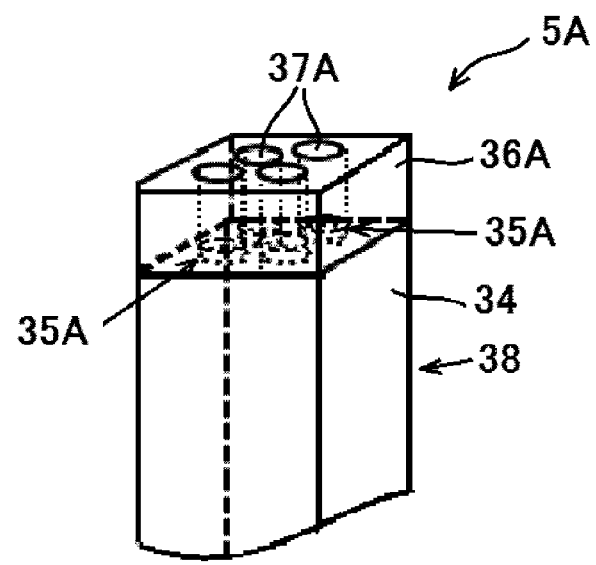
FIG. 1 is a schematic perspective view illustrating an example of a preferable embodiment of insulated wire material of the present invention.

Insulated wire material of the present invention includes an aspect in which an insulated wire including a non-divided conductor (single core conductor) is welded (aspect of using a single core conductor) and an aspect in which an insulated wire including divided conductors (multicore conductors) is welded (aspect of using divided conductors). Hereinafter, each aspect will be described.

The insulated wire material of the present invention in the aspect of using a single core conductor includes one or a plurality of insulated wires each of which includes a conductor including a single core conductor and a peripheral insulating layer with which a periphery of the conductor is coated. Further, at at least one end portion of the one or plurality of insulated wires (conductors), and preferably at both end portions thereof, a welding member to be welded to another end portion of the insulated wire material, a terminal, or the like is provided, via a welded portion welded to the single core conductor, on a peripheral surface of (on a side surface of, around) the welded portion. In the insulated wire material in this aspect, the conductor and the welded portion are placed and joined in an axial direction of the conductor (in tandem), and the welding member is arranged to the welded portion side by side so as to surround the welded portion and may preferably be placed and joined to further extend toward a tip direction of the conductor.

The insulated wire material of the present invention in the aspect of using divided conductors includes a flat conductor and a peripheral insulating layer with which a periphery of the flat conductor is coated. Further, at at least one end portion of the flat conductor, preferably at both end portions thereof, a welding member to be welded to another end portion of the insulated wire material, the terminal, or the like is provided, via a welded portion welded to the divided conductors constituting the flat conductor, on a peripheral surface of (on a side surface of, around) the welded portion (Depending on an axial length of the welding member, the welding member is arranged to the welded portion side by side and extends toward a tip direction of the flat conductor). That is, in the insulated wire material of the present invention, the flat conductor and the welded portion are placed and joined (in tandem) in an axial direction of the flat conductor, and the welding member is arranged to the welded portion side by side so as to surround the welded portion and is preferably placed and joined to further extend toward the tip direction of the flat conductor.

In the present invention, the wording "be arranged to the welded portion side by side so as to surround the welded portion" means placement and junction obtained by a method of manufacturing the insulated wire material in the present invention described below and encompasses a form in which (at least part of) the welding member is placed and joined in a vertical direction (radiation direction) of the welded portion with respect to an axis of the conductor. For example, the wording encompasses a form in which the welding member is joined to the flat conductor in a state in which the welding member surrounds (encloses) at least part of (preferably the whole) the peripheral surface of the welded portion and further preferably extends toward the tip direction of the conductor while maintaining the surrounding state. In the above-mentioned placement and junction, as illustrated in, for example, FIG. 8, the welded portion is placed to be in contact with the end portion of the single core conductor or divided conductors and is exposed to a surface of the welding member, the surface being placed in an extending direction of the end portion (a bottom surface of a recessed portion to be welded) (there is a gap in a tip direction of the welded portion). Thus, the above-mentioned placement and junction do not encompass a form in which the conductor, the welded portion, and the welding member are placed and joined (in tandem) in the axial direction of the conductor.

In the present specification, the insulated wire material of the present invention is referred to as "insulated wire material equipped with a welding member" in some cases in order to distinguish the insulated wire material from an insulated wire including a conductor and a peripheral insulating layer (not including a welding member).

In the present invention, the welded portion means a welded area formed in the insulated wire material by fiber-laser welding and encompasses, for example, an area formed by melting and mixing (for example, alloying or dissolving) materials of members to be welded, an area having a welding mark, an area strengthened after welding, and the like.

In the present invention, the welded portion is included in the single core conductor or at least one of the divided conductors, preferably in a plurality of single core conductors or divided conductors, and more preferably in all single core conductors or divided conductors.

Further, welding means that members to be welded are welded (butt welding, lap welding, spot welding, or the like) in a state in which the members are in direct contact with each other or are in contact with each other via another member or the like at the time of welding. Note that the state in which the members are in direct contact with each other encompasses an aspect in which the members are in contact with each other via plating layers or the like formed on surfaces of the members to be melted and made from various kinds of metal in order to improve weldability.

The conductor included in the insulated wire material of the present invention in the aspect of using a single core conductor includes a single core conductor, and, further preferably, a conductor insulating layer with which a peripheral surface of the single core conductor is coated. The single core conductor means a conductor including a conductor element wire having a single core and is also referred to as "non-divided conductor". The insulated wire material of the present invention in this aspect includes one or a plurality of insulated wires. In a case in which the plurality of insulated wires is provided, the number of insulated wires is not particularly limited and is set as appropriate depending on its use or the like. For example, two to six insulated wires can be set, and three to six insulated wires are preferable. The plurality of insulated wires, as well as conductors in the aspect of using divided conductors described below, may be placed in parallel to each other, may be helically placed (strand wires), or may be a molded body of strand wires.

The conductor included in the insulated wire material of the present invention in the aspect of using divided conductors includes a plurality of divided conductors placed in parallel to each other or helically placed and a conductor insulating layer interposed between the divided conductors.

In the present invention, the wording "the plurality of divided conductors is placed in parallel to each other" means that the plurality of divided conductors is placed side by side. The present invention is not limited to an aspect in which the plurality of divided conductors is placed geometrically in parallel to each other, as long as the plurality of divided conductors placed in parallel to each other functions as the conductor of the insulated wire material as a whole. Further, the wording "the plurality of divided conductors is helically placed" means that the plurality of divided conductors placed in parallel to each other is placed to be spirally twisted. Further, the wording "the plurality of divided conductors is helically placed" also encompasses an aspect in which the plurality of divided conductors is placed to be twisted in a braid shape.

In the present invention, both the shape of the conductor and the shape of the divided conductors are not particularly limited and are determined depending on a shape of the insulated wire material. For example, a cross-sectional shape vertical to the axis can be various shapes such as a rectangular shape (flat shape), a circular shape, an oval shape, and an indefinite shape, and a rectangular shape or a circular shape is preferable.

Figure 6:
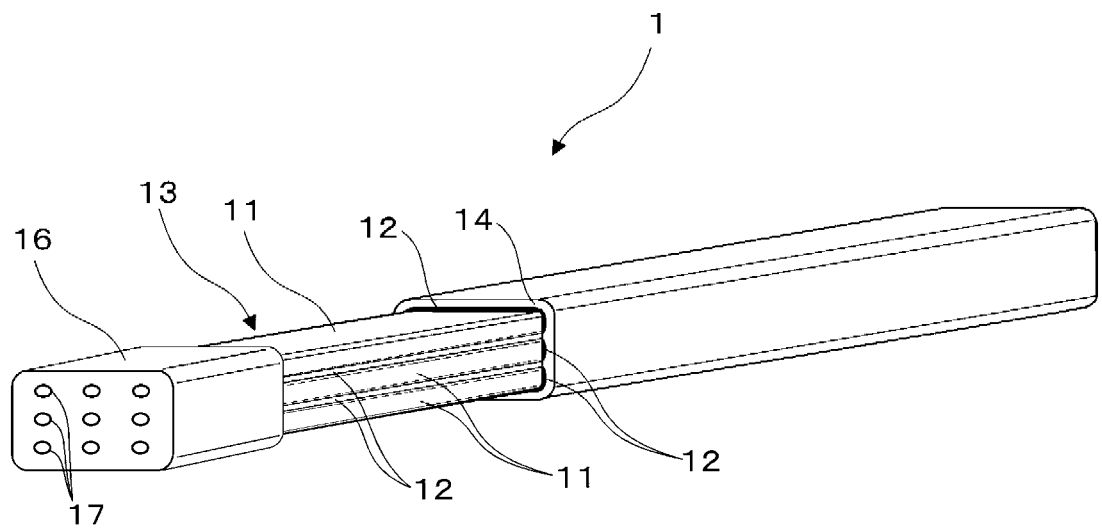
FIG. 6 is a schematic perspective view illustrating a state in which conductor insulating layers and a peripheral insulating layer are cut out in an example of a preferable embodiment of insulated wire material of the present invention.
Figure 10:
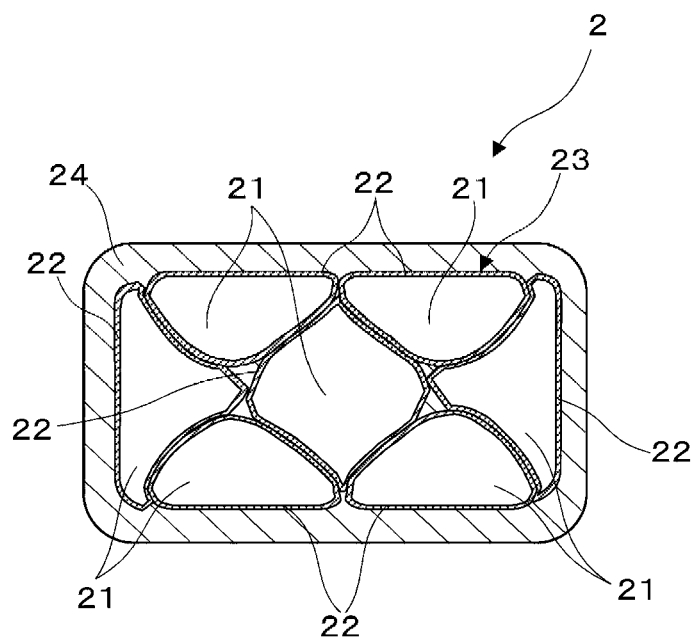
FIG. 10 is a cross-sectional view illustrating a cross-section of a portion including a peripheral insulating layer in the insulated wire material illustrated in FIG. 9, the cross-section being along a plane vertical to an axial direction.

In the present invention, the number of divided conductors constituting the conductor only needs to be two or more, is not limited to three illustrated in FIG. 6 or seven illustrated in FIG. 10, and can be set as appropriate depending on its use or the like.

More specifically, in a case in which the divided conductors are ribbon wires having a rectangular (flat or the like) or thin-plate-like cross-sectional shape, the number of divided conductors (the number of lamination thereof) constituting the flat conductor is set within the above-mentioned range, and two to eight divided conductors are preferable, and three to six conductors are more preferable. Meanwhile, in a case in which the conductor includes a flat molded body of strand wires as illustrated in FIG. 10, the number of divided conductors (the number of strand wires) constituting the conductor is set within the above-mentioned range. The number of divided conductors is preferably seven (a strand wire structure in which six divided conductors are placed around a single divided conductor) to a hundred, and is more preferably seven to thirty-seven.

In the insulated wire material in the aspect of using divided conductors, a wire including: a conductor including a plurality of divided conductors and a conductor insulating layer; and a peripheral insulating layer is referred to as "insulated wire" in some cases.

The insulated wire material of the present invention has excellent welding workability with the another end portion (welding member) of the insulated wire material, the terminal, or the like and can be electrically connected by TIG welding that is generally employed in manufacturing insulated wires on site.

Further, by using the divided conductors, the insulated wire material can reduce eddy current loss when the insulated wire material is used as a winding wire of a coil, has excellent welding workability with the another end portion (welding member) of the insulated wire material, the terminal, or the like, and can be electrically connected by TIG welding that is generally employed in manufacturing insulated wires on site. That is, the insulated wire material of the present invention in the aspect of using divided conductors includes a conductor including a plurality of divided conductors and a conductor insulating layer interposed between the divided conductors (also referred to as "collective conductor" because the conductor includes the plurality of divided conductors). Thus, the insulated wire material can reduce eddy current loss when the insulated wire material is used as a winding wire of a coil.

The insulated wire material of the present invention includes the welding member at at least one end portion of the conductor via the welded portion (fiber-laser welded area) so as to surround the welded portion. Thus, the welded portion has high strength, and the welded portion and the welding member are not easily detached from the single core conductor or the divided conductors, and therefore it is possible to maintain electrical connection.

Further, the welding member can be TIG-welded to the terminal or the like by TIG welding that has been conventionally and commonly used for welding insulated wires. As described above, the welding member is a member (alternative welding member) to be welded to the terminal or the like instead of a conductor, in particular, a collective conductor having inferior TIG welding workability, and is generally made from metal that can be TIG-welded to the terminal or the like.

Hereinafter, preferable embodiments of the insulated wire according to the present invention are described with reference to the drawings.

Figure 2:
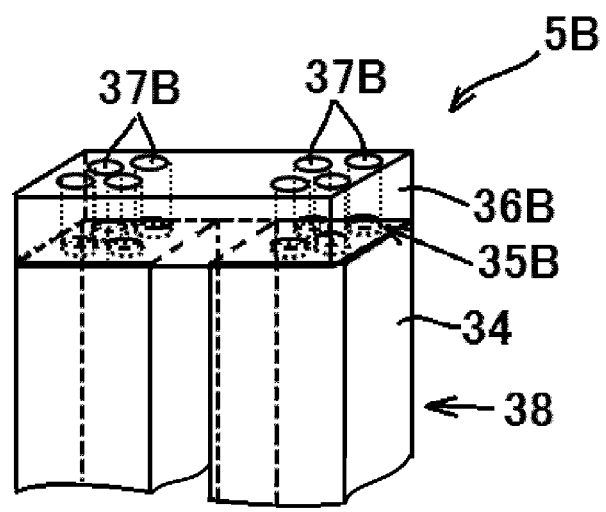
FIG. 2 is a schematic perspective view illustrating an example of another preferable embodiment of insulated wire material of the present invention.
Figure 3:
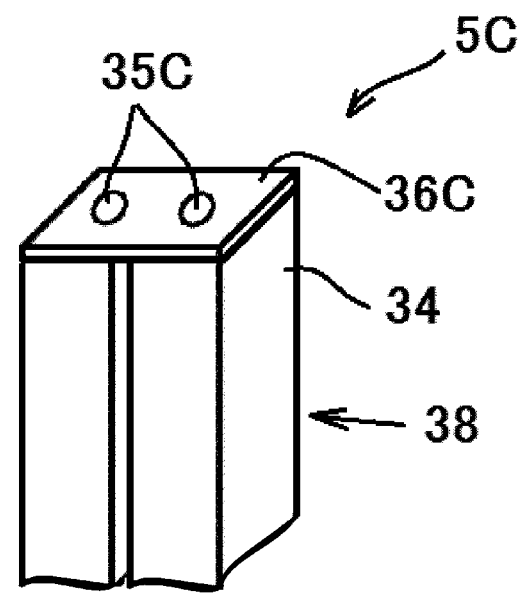
FIG. 3 is a schematic perspective view illustrating an example of still another preferable embodiment of insulated wire material of the present invention.

FIGS. 1 to 3 illustrate preferable embodiments of insulated wire material of the present invention in the aspect of using a single core conductor. Further, FIGS. 6 to 10 illustrate preferable embodiments of the insulated wire material of the present invention in the aspect of using divided conductors.

The present invention is not limited to the following embodiments, except for the matters stipulated in the present invention. Further, the form shown in each drawing is a schematic view for making comprehension of the present invention easy. Therefore, the size, the thickness, or the relative magnitude relation and the like of each member may be appropriately subjected to variation for the purpose of illustration. Accordingly, the drawing does not show a real relation as it is. Further, those other than the matters stipulated in the present invention are not limited to the external form and the shape shown in these drawings.

Hereinafter, the examples of preferable embodiment of the insulated wire according to the present invention are described with reference to the drawings.

Preferable insulated wire material 5A of the present invention illustrated in FIG. 1 includes a single insulated wire 38 and a welding member 36A provided at one end portion of a single core conductor (insulated wire 38) and joined to a peripheral surface of a welded portion 35A via the welded portion 35A. The insulated wire material 5A includes four welded portions 35A for the single core conductor.

Further, another piece of preferable insulated wire material 5B of the present invention illustrated in FIG. 2 includes two insulated wires 38 placed in parallel to each other and a welding member 36B provided at one end portion of at least one and preferably two single core conductors (not illustrated in FIG. 2) and joined to a peripheral surface of a welded portion 35B via the welded portion 35B. The insulated wire material 5B includes four welded portion 35B for a single core conductor.

Further, still another piece of preferable insulated wire material 5C of the present invention illustrated in FIG. 3 includes two insulated wires 38 placed in parallel to each other and a welding member 36C provided at one end portion of at least one and preferably two single core conductors (not illustrated in FIG. 3) and joined to a peripheral surface of a welded portion 35C via the welded portion 35C. The insulated wire material 5C includes one welded portion 35C for a single core conductor.

In pieces of the insulated wire material 5A to 5C, the insulated wire 38 includes the conductor 17 including a single core conductor having a rectangular cross-sectional shape and a peripheral insulating layer (not shown) with which a periphery of the single core conductor 17 is coated.

The pieces of the insulated wire material 5A to 5C have the same configuration, except that the number of insulated wires to be welded and a welding member are different.

[Insulated Wire]

As described above, the insulated wire 38 includes the single core conductor and preferably includes a conductor insulating layer (not shown) with which a peripheral surface of the single core conductor is coated and includes a peripheral insulating layer 34 with which the single core conductor is coated via the conductor coating layer.

The single core conductor means a conductor including a conductor element wire having a single core, and a single core conductor for use in general insulated wires is used. The single core conductor is the same as divided conductors described below, except that the conductor has a single core. For example, a shape (flat shape in the insulated wire 38) and dimensions of the single core conductor are also set as appropriate. A material thereof is the same as that of the divided conductors described below.

The conductor insulating layer with which the periphery of the single core conductor is coated is the same as a conductor insulating layer in insulated wire material of the present invention in the aspect of using divided conductors described below, except that the peripheral surface of the single core conductor is coated.

The conductor of the insulated wire includes the single core conductor and the conductor insulating layer and is the same as a conductor in the aspect of using divided conductors described below, except that the conductor includes the single core conductor instead of divided conductors.

Further, the peripheral insulating layer 34 is the same as a peripheral insulating layer in the insulated wire material of the present invention in the aspect of using divided conductors described below, except that the conductor insulating layer on the peripheral surface of the single core conductor is coated.

The insulated wire for use in the insulated wire material of the present invention in the aspect of using a single core conductor has the above-mentioned configuration, and a general insulated wire can be used without being particularly limited.

[Welding Member]

The pieces of the insulated wire material 5A to 5C include the welding members 36A to 36C, respectively, at one end portion of the single core conductor via the welded portion and on a peripheral surface of the welded portion.

In the present invention, the conductor insulating layer and the peripheral insulating layer may remain (without being subjected to a stripping (removal) process) at the end portion of the single core conductor, and the peripheral surface of the single core conductor does not need to be exposed.

The welding members 36A to 36C are members to be welded to a terminal or the like instead of the conductor. The welding members 36A to 36C are generally made from metal that can be TIG-welded to the terminal or the like and is preferably made from a material described in the description regarding the welding member in the insulated wire material of the present invention in the aspect of using divided conductors described below.

A shape of the welding member is not particularly limited as long as the shape allows TIG welding to the terminal or the like and achieves the above-mentioned placement and junction state by a method of manufacturing insulated wire material of the present invention described below and is determined as appropriate depending on a shape of the terminal or the like to be welded, placement of the divided conductors constituting the flat conductor, and the like.

The welding members 36A to 36C are preferably the same as a welding member of insulated wire material of the present invention in the aspect of using divided conductors described below, except that a shape, array, and the like of recessed portions to be welded that is to be welded to the single core conductor of the insulated wire are different. For example, the welding member 36A illustrated in FIG. 1 is formed into a rectangular parallelepiped block including four recessed portions to be welded (bottomed holes) 37A recessed in two lines lengthwise and breadthwise from an outer surface, and the welded portions 35A are formed in bottomed portions. Further, the welding member 36B illustrated in FIG. 2 is formed into a rectangular parallelepiped block having eight bottomed holes 37B (two groups of four bottomed holes) recessed in two lines lengthwise and breadthwise from an outer surface, and the welded portions 35B are formed in bottomed portions. Further, the welding member 36C illustrated in FIG. 3 is formed into a thin plate shape and has no recessed portion to be welded (bottomed hole), and two welded portions 35C are formed in the whole thickness direction. That is, the welding member 36C is joined, via the two welded portions 35C welded to the single core conductor, to peripheral surfaces of the welded portions 35C at an end portion of the insulated wire 38.

Those welding members are preferably the same as the welding member of the insulated wire material of the present invention in the aspect of using divided conductors described below other than the number and array of the bottomed holes.

In the above-mentioned insulated wire material, an area ratio [$S^{c1}:S^{c2}$] of a cross-sectional area $S^{c1}$ of the welding member before welding to a cross-sectional area $S^{c2}$ of the conductor (a total value including cross-sectional areas of both the insulating layers) preferably satisfies an area ratio defined in the description regarding the welding member in the insulated wire material of the present invention in the aspect of using divided conductors described below.

[Welded Portion]

In each of the pieces of the insulated wire material 5A to 5C including the single core conductor, the welded portion is an area defined by a welding surface of each of the welding members 36A to 36C (Details thereof will be described in the description regarding the insulated wire material of the present invention in the aspect of using divided conductors described below.) and a welding surface of the single core conductor, and the number of formation of welded portions is determined depending on welding strength and the like. For example, at least one welded portion is preferably included in the insulated wire material, and at least one welded portion is more preferably included in each single core conductor. The preferable number of welded portions is as described below.

The welded portions are the same as the welded portion in the insulated wire material of the present invention in the aspect of using divided conductors described below, except that, in each of the pieces of the insulated wire material 5A to 5C, the welded portion is formed on the single core conductor (insulated wire). Further, a method of welding the single core conductor (insulated wire) and the welding members is also the same as a method of welding the insulated wire material of the present invention in the aspect of using divided conductors described below.

[State in which End Surface of Conductor and Welding Member Abut Against Each Other]

In the present invention, a state in which the end surface of the conductor and the welding member abut against each other is not particularly limited and is set to a state in which the end surface of the conductor and an surface (preferably, welding surface) of the portion to be welded in the welding member, which are to be fiber-laser welded, are in contact (preferably, surface contact) with each other. Generally, an abutting state can be employed as appropriate depending on a shape of the surface of the portion to be welded in the welding member or the end surface of the conductor.

Figure 4:
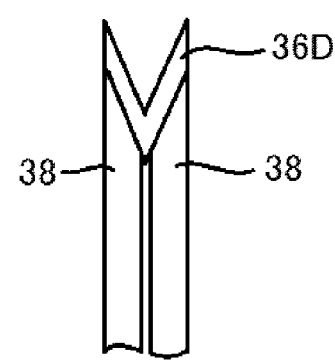
FIG. 4 is a schematic perspective view illustrating a state in which a plurality of insulated wires and a welding member abut against each other.
Figure 5:
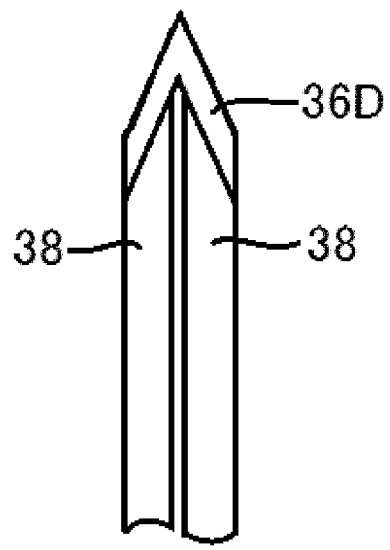
FIG. 5 is a schematic perspective view illustrating another state in which a plurality of insulated wires and a welding member abut against each other.

For example, in each of the pieces of the insulated wire material 5A to 5C (at the time of fiber-laser welding), the end surface of the conductor and the welding member are welded in a state in which both the end surface and the welding member abut against each other in parallel to a surface vertical to an axis of the insulated wire. As an abutting state other than the above abutting state, specifically, in a case in which the surface of the portion to be welded in the welding member is an inclined surface (V-shaped welding member 36D) as illustrated in FIGS. 4 and 5, the end surface of the single core conductor or the insulated wire is processed to have an inclined surface, and the single core conductor (insulated wire) is placed so that this inclined surface abuts against (is brought into contact with) the surface of the portion to be welded in the welding member, and then those abutting end surfaces are irradiated with fiber lasers from, for example, the axial direction of the single core conductor and can therefore be welded.

The state in which the end surface of the conductor and the welding member abut against each other and the irradiation method described above are also applicable to the insulated wire material of the present invention in the aspect of using divided conductors described below.

Figure 7:
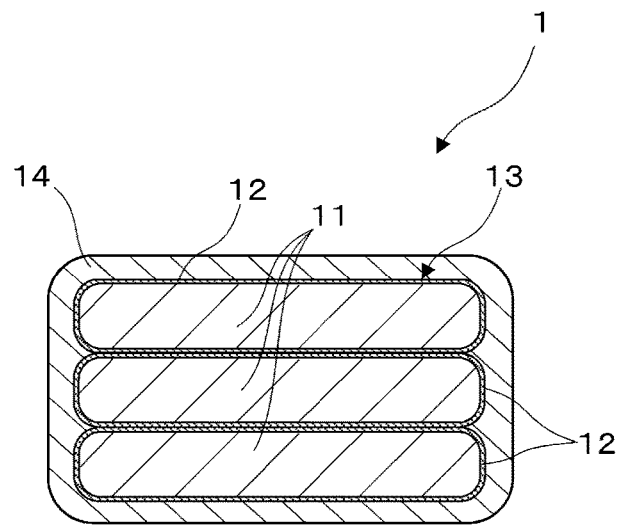
FIG. 7 is a cross-sectional view illustrating a cross-section of a portion including a peripheral insulating layer in the insulated wire material illustrated in FIG. 6, the cross-section being along a plane vertical to an axial direction.
Figure 8:
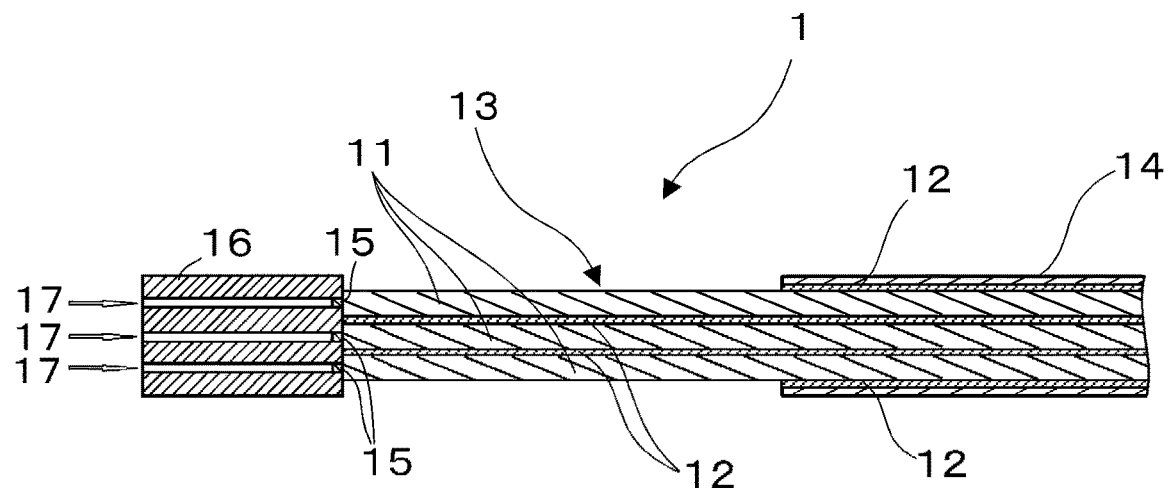
FIG. 8 is a cross-sectional view illustrating a cross-section of a central part in a width direction of the insulated wire material illustrated in FIG. 6 along a plane vertical to the width direction and parallel to a height direction.

Examples of a particularly preferable embodiment in the insulated wire material of the present invention in the aspect of using divided conductors are illustrated in FIGS. 6 to 8.

In FIG. 6, a width direction and a thickness (height) direction of the insulated wire material are defined as a width direction of divided conductors 11 and a lamination direction of the divided conductors 11, respectively.

Hereinafter, a conductor (also referred to as "flat conductor") 13 whose cross-sectional shape is a preferable rectangular shape will be described.

A preferable insulated wire material 1 of the present invention illustrated in FIGS. 6 to 8 includes the flat conductor 13, a peripheral insulating layer 14 with which a periphery of the flat conductor 13 is coated, and a welding member 16 provided at one end portion of the flat conductor 13 and joined to a peripheral surface of a welded portion 15 via a welded portion 15 (see FIG. 8).

Note that FIGS. 6 and 8 illustrate the insulated wire material 1 in which part of conductor insulating layers 12 and the peripheral insulating layer 14 is cut out in order to illustrate a structure of the flat conductor 13. That is, FIGS. 6 and 8 illustrate the flat conductor 13 in which part of the peripheral insulating layer 14 has been removed by a stripping process (in which the conductor insulating layers 12 between the divided conductors 11 remain).

[Conductor (Flat Conductor)]

The flat conductor 13 includes three divided conductors 11 placed (laminated) in parallel to each other and conductor insulating layers 12 at least interposed between the divided conductors 11. The flat conductor 13 is formed by laminating, in a thickness direction of the divided conductors 11, the three divided conductors (for example, enameled wires) 11 including the conductor insulating layers 12 with which peripheral surfaces thereof are coated. Therefore, as illustrated in FIG. 7, the conductor insulating layers 12 with which the respective divided conductors 11 are coated (i.e., two conductor insulating layers 12) exist between the two laminated divided conductors 11.

In a conventional insulated wire, a peripheral insulating layer and conductor insulating layers are subjected to a stripping (peeling and removing) process at the time of TIG welding to the terminal or the like, but the conductor insulating layers between the divided conductors remain without being peeled or removed. Therefore, depending on a thickness, a material, and the like of the conductor insulating layers, the remaining conductor insulating layers deteriorate TIG weldability, and TIG welding cannot be performed with respect to the terminal or the like with sufficient strength. However, as described below, the insulated wire of the present invention can be TIG-welded to the terminal or the like with sufficient strength even if the peripheral insulating layer and the conductor insulating layers are not subjected to the stripping (peeling and removing) process.

The flat conductor 13 can be prepared by a publicly-known method. For example, the flat conductor 13 can be prepared by parallelly or helically placing enameled wires each of which includes the conductor insulating layer 12 with which a peripheral surface thereof is coated.

There has been described a form in which the flat conductor 13 is used as a conductor in the insulated wire material 1. However, in the present invention, the shape of the conductor is not particularly limited to a flat cross-sectional shape as described above.

Further, in a case in which the conductor includes divided conductors and conductor insulating layers, the conductor may be strand wires of the divided conductors or may be a strand-wire molded body obtained by molding the strand wires of the divided conductors. A cross-sectional shape of the strand-wire molded body is not particularly limited and can be the shape described in the description regarding the above-mentioned cross-sectional shape of the conductor.

<Divided Conductor>

The divided conductors 11 are one of conductor element wires constituting the flat conductor 13, and the plurality of divided conductors 11 cooperatively constitutes the flat conductor 13 and therefore contributes to reduction in eddy current loss. As described above, the divided conductors 11 can be referred to as conductor element wires obtained by dividing the single flat conductor 13 into a plurality of conductors.

The divided conductors 11 constituting the flat conductor 13 are ribbon wires having a rectangular (flat) cross-sectional shape. In the present invention, the conductor having a rectangular cross-sectional shape encompasses a conductor having a rectangular cross-section and a conductor having a square cross-section. Further, as illustrated in FIG. 7, the conductor also encompasses a conductor having chamfered portions obtained by chamfering corner portions of a cross-section (for example, subjecting four corners to a rounding (radius of curvature r (not illustrated)) chamfer process, a 45-degree chamfer process, or the like).

As the divided conductors 11, general divided conductors for use in insulated wires can be widely used, and, for example, a metal conductor such as a copper wire or an aluminum wire can be used. High-purity copper having purity of 99.95% (3N) or more and not containing oxide is preferable. Specifically, the examples thereof may be included oxygen-free copper (OFC):C1020 (purity of 99.96% or more) or electron-tube oxygen-free copper (TPC: Tough-Pitch Copper):C1011 (purity of 99.99% or more). Oxygen-free copper having an oxygen content of 30 ppm or less is more preferable, and the high-purity copper can be oxygen-free copper of 20 ppm or less is further preferable.

In order to weld end surfaces of the divided conductors 11 to the surface of portion to be welded in the welding member 16, in this embodiment, to the bottom surface of the recessed portion to be welded in the welding member 16, the end surfaces of the divided conductors 11 are formed on a plane corresponding to the (bottom) surface of portion to be welded, the plane being generally a flat plane, and are preferably formed on a flat plane parallel to the end surface of the welding member 16 described below (so that both the end surfaces are brought into contact with each other when the surfaces abut against each other).

The size of the divided conductor 11 is not particularly limited. In the rectangular cross-sectional shape, the thickness (short side) thereof is preferably from 0.4 to 3.0 mm, and more preferably from 0.5 to 2.5 mm, and the width (long side) thereof is preferably from 1.0 to 5.0 mm, and more preferably from 1.4 to 4.0 mm. The ratio of the thickness to the width (the thickness:the width) is preferably from 1:1 to 1:8, and more preferably from 1:1 to 1:4. Note that, in a case in which the ratio of the thickness to the width (the thickness:the width) is 1:1, a long side means a pair of facing sides, and a short side means another pair of facing sides.

In a case in which the corner portions of the cross-section of the divided conductors 11 are chamfered, the radius of curvature r is preferably 0.6 mm or less, more preferably from 0.1 to 0.4 mm, and further preferably from 0.2 to 0.4 mm. By chamfering the corner portions of the cross-section as described above, partial discharge from the corner portions can be restrained.

The number of lamination of the divided conductors 11 is preferably two or more but eight or less. In a case in which the number of lamination is two, reduction in eddy current loss in a radio frequency is expected, and, as the number of layers is increased, eddy current loss is further reduced. In addition, in a case in which the number of lamination is equal to or less than eight, a lamination state is not easily shifted. Further, although an occupation rate of the conductor insulating layer 12 in the cross-section of the flat conductor 13 is increased, a high filling rate of the divided conductors 11 can be secured, and sufficient reduction in eddy current loss is expected. From the above, the number of lamination is practically eight or less, and six or less is preferable.

A direction in which the divided conductors 11 are laminated may be any one of the thickness direction and the width direction, as long as the conductor insulating layers 12 exist between the divided conductors 11. The divided conductors 11 are preferably in contact with each other in the width direction and are laminated in the thickness direction.

<Conductor Insulating Layer>

The conductor insulating layers 12 only need to be insulating layers existing between the divided conductors 11, and, in the insulated wire material 1, are provided as insulating layers with which the peripheral surfaces of the divided conductors 11 are coated.

The conductor insulating layers 12 only need to obtain an effect of reduction in eddy current loss, and therefore, in order to prevent the flat conductor 13 from being too thick, a thickness thereof is preferably from 0.01 to 10 µm, more preferably from 0.01 to 3 µm, and further preferably from 0.1 to 1 µm. In the present specification, the thickness of the conductor insulating layers 12 indicates a thickness that is obtained by observing, by using a microscope, a cross-section of the insulated wire material 1 cut in a direction vertical to a longitudinal axial direction thereof.

Each conductor insulating layer 12 may have a single layer structure, a two layer structure, or a three or more layer structure. According to the present invention, the number of layers of each layer is determined by observing a cross-section of the layer, irrespective of whether the types and contents of the resins and additives forming the layer are different or identical. Specifically, when a cross-section of a certain layer is observed at a magnification ratio of 200 times, in a case in which annual ring-like boundaries cannot be recognized, the total number of the certain layer is considered as 1, and in a case in which annual ring-like boundaries can be recognized, the number of layers of the certain layer is designated as (number of boundaries+1).

The conductor insulating layer 12 is preferably an insulating layer made from organic polymers (organic resin) and is preferably an insulating layer (enameled layer) containing thermosetting organic polymers (thermosetting resin) as a resin component. Any thermosetting resin can be used without being particularly limited, as long as the thermosetting resin is generally used for wires. Specific example thereof may include polyamideimide (PAI), polyimide (PI), polyetherimide (PEI), polyesterimide (PEsI), polyurethane (PU), polyester (PEst), polybenzoimidazole, a melamine resin, an epoxy resin, or the like. Among these, polyamideimide, polyimide, polyetherimide, polyesterimide, polyurethane, or polyester is preferred. The conductor insulating layer may contain one kind or two or more kinds of thermosetting resins.

The conductor insulating layer 12 may be a dense insulating layer made from the above-mentioned organic polymers or may be an insulating layer including cells (air) therein. When air is included in the layer, a dielectric constant is reduced, and therefore it is possible to restrain partial discharge and corona discharge occurring in an air gap between the divided conductors when a voltage is applied. In the present invention, the dense insulating layer generally means an insulating layer including no cell in the insulating layer, but encompasses, for example, an insulating layer including cells such as cells that may inevitably exist, as long as the effect of the present invention is not impaired.

An expansion ratio of conductive insulating layer having cells is preferably 1.2 times or more, and more preferably 1.4 times or more. There are no particular limitations on the upper limit of the expansion ratio, but it is usually preferable to set the expansion ratio to 5.0 times or less. The expansion ratio is obtained by determining the density $\rho f$ of the organic polymer (the conductive insulating layer 12) coated for foaming and the density $\rho s$ of the polymer before foaming by the underwater replacement method, and calculating the expansion ratio from $\rho s/\rho f$.

The size of cells containing the conductive insulating layer, that is, an average cell size is preferably 10 µm or less, more preferably 5 µm or less, further preferably 3 µm or less, particularly preferably 1 µm or less. Since a dielectric breakdown voltage may be decreased when the average cell size exceeds 10 µm, the dielectric breakdown voltage can be maintained successfully by adjusting the average cell size to 10 µm or less. Furthermore, the dielectric breakdown voltage can be retained more certainly by adjusting the average cell size to 5 µm or less, further 3 µm or less. Although the lower limit of the average cell size is not limited, it is practical and preferable that the lower limit is 1 nm or more. The average cell size is a value obtained by observing a cross-section of the conductor insulating layer 12 by using a scanning electron microscope (SEM), then selecting fifty cells in total from an observed area at random, measuring diameters of the cells in a diameter measurement mode by using image size measurement software (WinROOF: trade name, manufactured by MITANI Corporation), and averaging those measured diameters. This cell size can be adjusted by an expansion ratio, a concentration of the resin, a viscosity, a temperature, an addition amount of the foaming agent, a temperature of the baking furnace, and the like.

The conductor insulating layer 12 may contain various kinds of additives that are generally used for wires. In this case, a content of the additives is not particularly limited, but is preferably 5 parts by mass or less and more preferably 3 parts by mass or less, with respect to 100 parts by mass of the resin component.

The conductive insulating layer 12 can be formed by a known method.

For example, the conductor insulating layer 12 containing no cell is preferably formed by a method of applying a varnish of the above-mentioned organic polymers to the peripheral surface of each divided conductor 11 or the surface thereof laminated on another divided conductor and baking the varnish. This varnish includes a resin component and a solvent, and if necessary, also includes a curing agent for the resin component or various additives. The solvent is preferably an organic solvent, and any solvent capable of dissolving or dispersing the resin component is selected as appropriate.

Regarding the method for applying a varnish, a conventional method can be selected, and for example, a method of using a die for varnish application having an opening that has a shape similar or approximately similar to the cross-sectional shape of the divided conductor 11, may be employed. Baking of the varnish is usually carried out in a baking furnace. The conditions employed at baking vary depending on the type of the resin component or the solvent, and the like and cannot be determined uniformly; however, for example, conditions including a furnace temperature of 400° C. to 650° C. and a passing time period (a backed time period) of 10 to 90 seconds may be mentioned.

The thickness of the conductor insulating layer 12 can be set as appropriate depending on an application amount of varnish, the number of times of application, or the like.

As a method of forming a conductor insulating layer including cells (air), a general method can be selected, and there is, for example, a method similar to the above-mentioned method of forming the conductor insulating layer 12 including no cells by using a varnish containing a publicly-known foaming agent.

[Peripheral Insulating Layer]

The peripheral insulating layer 14 with which the flat conductor 13 is coated is directly or indirectly (via another layer) provided on a peripheral surface of the flat conductor 13. The another layer is an adhesive layer or the like. The peripheral insulating layer 14 has a high adhesive strength with the flat conductor 13, and at least one layer is provided outside the flat conductor 13. One or a plurality of layers may be provided.

Although FIGS. 6 and 8 illustrate the state in which the part of the peripheral insulating layer 14 has been removed by the stripping process, the peripheral insulating layer may or may not be stripped in the present invention. This is because, in the present invention, even if the peripheral insulating layer is not stripped, soot and blowholes are restrained from being generated and remaining at the time of welding, and the flat conductor and the welding member can be welded with high strength.

The peripheral insulating layer 14 is provided on the periphery of the flat conductor 13, and the peripheral insulating layer 14 is made from, for example, thermoplastic resin. The thermoplastic resin preferably has a melting point of 300° C. or more, and further preferably 330° C. or more in terms of having heat-aging resistance, having excellent adhesive strength between the flat conductor 13 and the peripheral insulating layer 14, having excellent solvent resistance, and improving performance of electrical/electronic equipment. An upper limit of the melting point of the thermoplastic resin is not particularly limited, but is preferably, for example, 450° C. or less in order to form the peripheral insulating layer in an extrusion process. The melting point of the thermoplastic resin can be measured by differential scanning calorimetry analysis (DSC).

As the thermoplastic resin, any thermoplastic resin can be used without being particularly limited, as long as the thermoplastic resin is generally used for wires. Examples thereof encompass polyetheretherketone (PEEK), modified polyetheretherketone (modified-PEEK), thermoplastic polyimide (TPI), polyamide having an aromatic ring (referred to as "aromatic polyamide"), polyketone (PK), and the like.

As the above-mentioned thermoplastic resin, it is also possible to use polyaryletherketone (PAEK) that is thermoplastic resin having an aromatic rings an ether bond and a ketone bond, typified by polyether ketone (PEK) or polyetheretherketone. Alternatively, it is also possible to use modified polyetheretherketone obtained by mixing polyetheretherketone with another thermoplastic resin. Alternatively, it is also possible to use at least one kind of thermoplastic resin selected from the group consisting of thermoplastic polyimide (TPI). As the thermoplastic resin, a single kind of thermoplastic resin or two or more kinds of thermoplastic resin may be used. Further, the above-mentioned modified polyetheretherketone is, for example, a mixture obtained by adding polyphenylsulfone to polyetheretherketone, and, as to a mixing ratio thereof, polyphenylsulfone mixed therein is less than polyetheretherketone mixed therein.

In a case in which the peripheral insulating layer 14 is made from thermoplastic resin, the peripheral insulating layer 14 is preferably formed on the periphery of the flat conductor 13 by extrusion-molding a resin composition. The resin composition contains the above-mentioned thermoplastic resin and contains various kinds of additives if necessary. The extrusion method cannot be uniformly determined depending on the kind of thermoplastic resin or the like, but is, for example, a method of extruding thermoplastic resin at a temperature equal to or more than a melting point of the thermoplastic resin by using an extrusion die having an opening similar or approximately similar to the cross-sectional shape of the flat conductor 13. The extruding temperature is preferably a temperature that is 40 to 60° C. higher than the melting point of the thermoplastic resin.

The peripheral insulating layer 14 is not limited to a peripheral insulating layer formed by extrusion molding, and the peripheral insulating layer 14 can also be formed in the same way as the above-mentioned enameled layer by using a varnish that contains the above-mentioned thermoplastic resin, a solvent, and the like and, if necessary, contains various kinds of additives.

In the present invention, the peripheral insulating layer 14 is preferably formed by extrusion molding in terms of productivity.

The peripheral insulating layer 14 may contain various kinds of additives that are generally used for wires. In this case, a content of the additives is not particularly limited, but is preferably 5 parts by mass or less and more preferably 3 parts by mass or less, with respect to 100 parts by mass of the resin component.

A thickness of the peripheral insulating layer 14 is preferably from 40 to 200 μm in order to show sufficient flexibility and prevent insulation failure. That is, when the thickness is preferably 40 μm or more, and more preferably 50 μm or more, no insulation failure is caused and sufficient insulation is secured. Further, because the thickness is 200 μm or less, sufficient flexibility is obtained. Therefore, the insulated wire material 1 can be bent to be used.

<Welding Member>

The insulated wire material 1 includes the welding member 16 via the welded portion 15 (see FIGS. 6 and 8) at one end portion of the flat conductor 13.

In the present invention, the conductor insulating layers 12 and the peripheral insulating layer 14 may remain (without being subjected to the stripping (removal) process) at an end portion of the flat conductor 13, and a peripheral surface of the flat conductor 13 does not need to be exposed. Further, among the conductor insulating layers 12, the conductor insulating layer other than the conductor insulating layers interposed between two adjacent divided conductors 11 may be removed (see FIGS. 6 and 8) or may remain without being removed. In the present invention, when the wording "the end portion of the flat conductor 13" is simply used, the wording encompasses each of the above-mentioned aspects.

At end portions of the divided conductors 11, at least the conductor insulating layers 12 between the divided conductors 11 remain. This is because the conductor insulating layers 12 cannot be removed in the stripping process of the peripheral insulating layer 14 as described above.

In a case in which the stripping process is performed, the conductor insulating layers 12 and the peripheral insulating layer 14 formed on the periphery of the flat conductor 13 are generally peeled to expose the peripheral surface of the divided conductors 11 at the end portions of the divided conductors 11 (see FIGS. 6 and 8). In this case, an exposed length is preferably, for example, 1 mm or more from an end surface of the flat conductor 13 in order to secure a welding margin. Further, the exposed length is preferably 10 mm or less from the end surface of the flat conductor 13 in order to reduce exposure of the divided conductors 11 as much as possible.

Those exposed peripheral surfaces of the divided conductors are generally coated together with the welded portion, if necessary, after the insulated wire material is welded to the terminal or the like.

The welding member 16 is a member to be welded to the terminal or the like instead of a flat collective conductor. The welding member 16 is generally made from metal that can be TIG-welded to the terminal or the like and is preferably made from the same material as the divided conductors 11. For example, the welding member is more preferably made from the above-mentioned high-purity copper (oxygen-free copper or electron-tube oxygen-free copper) that is a material from which the divided conductors 11 are preferably made. With this, it is possible to improve strength of the welded portion to be formed. Further, blowholes (spherical hollows or pores) caused by contained oxygen or resin from which the conductor insulating layers are made can be restrained from being generated at the time of welding. This can reduce electric resistance of the welded portion. Further, because the welding member 16 is made from the same material as the divided conductors 11, there is no difference in melting point between the divided conductors 11 and the welding member 16. Thus, it is possible to form the welded portion 15 that is firmly joined to both the divided conductors 11 and the welding member 16.

In the insulated wire material 1, the welding member 16 is formed into a rectangular parallelepiped block having nine bottomed holes recessed from the outer surface. However, in the present invention, a shape of the welding member is not particularly limited as long as the shape allows TIG welding to the terminal or the like and achieves the above-mentioned placement and junction state by the method of manufacturing the insulated wire material in the present invention described below and is determined as appropriate depending on a shape of the terminal or the like to be welded, the placement of the divided conductors constituting the flat conductor, and the like.

In the present invention, the welding member only needs to have a shape that, in a state in which a portion to be welded that is to be irradiated with fiber lasers to be formed as the welded portion and the end surface of the flat conductor 13 (in particular, the end surfaces of the divided conductors) abut against each other (are placed on each other), allows the portion to be welded to be irradiated with fiber lasers in the thickness direction of the portion to be welded from the outside of the portion to be welded (from a direction crossing abutting surfaces, preferably from the vertical direction, toward the divided conductors). Examples of such the shape encompass a shape in which a bottom portion to be formed as the portion to be welded has one or a plurality of recessed portions to be welded at positions facing the end surfaces of the divided conductors. Each of the recessed portions to be welded only needs to have a shape and a portion recessed from the outer surface of the welding member and specifically encompasses a bottomed hole, a hollow portion, a cut-out portion, and the like. Note that, in a case of a thin plate-like welding member having a thickness that can be melted (formed as the welded portion) by irradiation with fiber lasers, such as the above-mentioned welding member 36C, it is unnecessary to provide the recessed portions to be welded. Opposite surfaces of the recessed portions to be welded, which face openings thereof, are caused to abut against the end surfaces of the divided conductors, and bottom portions that are thinner than the welding member correspond to the portions to be welded (welding margins) and are formed as welded portions. A shape and dimensions of the recessed portions to be welded are set to an appropriate shape and dimensions depending on the end portion of the flat conductor to be welded. However, the thickness of the bottom portions of the recessed portions to be welded is set to a thickness that can be melted (formed as the welded portion) by irradiation with fiber lasers. The thickness of the bottom portion cannot be uniformly determined depending on fiber laser irradiation conditions, but is, for example, 0.1 to 1 mm. A cross-sectional shape of each recessed portion to be welded is not particularly limited and can be, for example, various shapes such as a circular shape, an oval shape, a rectangular shape, and an indefinite shape, and may be formed to have a cross-sectional (end surface) shape the same as or similar to a shape of the end surfaces of the divided conductors 13, the end surfaces being to be welded to the welding member 16.

Array (placement) and the number of recessed portions to be welded are determined depending on array and the like of the divided conductors constituting the flat conductor. In the present invention, in terms of welding strength, the array and the number of recessed portions to be welded are preferably determined so that welded portions are formed while at least one recessed portion to be welded abutting against each of the divided conductors. The number of recessed portions to be welded abutting against each divided conductor is not particularly limited but is, for example, one to sixteen.

In the insulated wire material 1, the recessed portions to be welded have a circular cross-sectional shape and are placed in three rows and three columns so that three recessed portions to be welded abut against each divided conductor at intervals in the width direction.

In the present invention, it is unnecessary to place the recessed portion to be welded for each of the divided conductor constituting the flat conductor (weld each divided conductor to the portion to be welded), and the recessed portions to be welded may be placed for part of the divided conductors (for example, in the flat conductor 13, two divided conductors other than the central divided conductor 11) depending on its use or welding strength.

Note that, although the welding member can also be considered to be a member that does not include a portion to be welded that is to be formed as a welded portion after welding, in the present invention, the welding member is considered to be a member including a portion to be welded or welded portion.

An outer shape of the welding member only needs to be a shape that allows TIG welding to the terminal or the like, and examples thereof encompass a hexahedral shape, a spherical shape, a hemispherical shape, a plate shape, a disc shape, a ring shape, and the like.

Dimensions of the welding member 16 are also not particularly limited, as long as the welding member 16 has a shape that can be TIG-welded to the terminal or the like and are determined as appropriate depending on a shape of the terminal or the like to be welded.

In the present invention, the welding member (outer shape, recessed portions to be welded) is not limited to the above welding member and can be changed as appropriate.

For example, the recessed portions to be welded may have the same dimensions (cylindrical shape) in a depth direction or may have a tapered shape (frustum of cone shape) that is gradually reduced or increased.

Further, as illustrated in FIG. 6, the recessed portions to be welded may be configured so that the divided conductors can be separately welded (may be an aggregation of a plurality of recessed portions) in accordance with the number and placement of the divided conductors constituting the flat conductor or may be configured so that the flat conductor can be welded as a whole (may be a recessed portion corresponding to the flat conductor).

Further, the welding members illustrated in FIGS. 6 to 10 are welding members to which a single flat conductor is welded. In the present invention, however, as illustrated in FIGS. 2 and 3, the welding members may be a welding member to which two or more conductors are collectively welded. In this case, a plurality of pieces of insulated wire material can be welded to the terminal or the like at one time.

The welding member for use in the present invention can be prepared by a general method of manufacturing a metal member, for example, by a method of casting molten metal to a molding having predetermined dimensions, turning, polishing, cutting, and the like.

In the present invention, the area ratio [$S^{c1}:S^{c2}$] of the cross-sectional area $S^{c1}$ of the welding member 16 before welding to the cross-sectional area $S^{c2}$ (total value) of the flat conductor 13 preferably satisfies a range of 1:0.8 to 1:1.2, and more preferably a range of 1:0.9 to 1:1.1. With this, a difference from a size of the conductor is reduced, and therefore handling (workability) at the time of welding is improved.

In the present invention, the cross-sectional area $S^{c1}$ of the welding member 16 before welding has the same meaning as an area of the end surface (welding surface) 161 of the welding member to be welded to the flat conductor 13. Further, the cross-sectional area $S^{c2}$ of the flat conductor 13 is larger than an area of the end surface (welding surface) of the flat conductor 13 to be welded to the welding member and is a cross-sectional area of the insulated wire material including the conductor insulating layers and the peripheral insulating layer.

At least one of the welding member 16 and the end portion of the flat conductor 13 (the divided conductors 11) preferably includes, on the end surface or the peripheral surface in the vicinity of the end surface, a layer (not illustrated) containing a material for improving welding workability and welding strength. For example, such the material is preferably tin in a case in which the welding member 16 and the flat conductor 13 are made from copper or a copper alloy.

A tin layer does not need to be a layer, as long as tin exists on the end surface or the peripheral surface in the vicinity of the end surface, but is preferably a tin plating layer. The tin layer preferably has a thickness of 0.1 to 5 μm, and more preferably the thickness of 0.3 to 3 μm in order to improve tensile strength. Because the thickness of the tin layer is set to fall within the above-mentioned range, the tin layer can have favorable tensile strength. Meanwhile, in a case in which the tin layer is too thick, the tin layer tends to be segregated at a melted portion. Such segregation causes cracks, and, as a result, the tensile strength is reduced.

<Welded Portion>

The welded portion 15 is an area defined by a welding surface of the welding member 16 (in a case of the recessed portions to be welded 17, a surface opposite a surface on which the recessed portions to be welded 17 are open) and welding surfaces of the divided conductors 11. Although the number of formation of welded portions is determined depending on welding strength or the like, at least one welded portion is provided. In the present invention, at least one welded portion is preferably formed for each of the divided conductors 11 in terms of welding strength. The welded portion 15 generally has a welding mark. The welded portion 15 is specifically a portion formed by melting, solidifying, and integrating an area from a laser beam irradiation surface (surface) to abutting surfaces of the divided conductors 11 and the welding member 16 and the vicinity thereof. The welded portion 15 is formed by, in a state in which the portion to be welded of the welding member 16 and the end surfaces of the divided conductors 11 are placed on each other, irradiating the portion to be welded with fiber laser beams in the thickness direction of the portion to be welded from the outside of the portion to be welded, thereby melting and integrating the portion to be welded and the end surfaces of the divided conductors 11 and the vicinity thereof. The welded portion 15 is generally formed into a cylindrical shape in such a manner that the portion to be welded and the end portions of the divided conductors 11 are melted and solidified as a whole. However, the welded portion 15 may be formed in such a manner that only a portion swept by laser beams (sweeping mark) is melted and solidified.

In particular, in the divided conductors 11, a material from which the portion to be welded of the welding member 16 is made and a material from which the divided conductors 11 are made are mixed (alloyed, dissolved) in the welded portions 15. However, as described below, it is possible to restrain a material from which the conductor insulating layers 12 and the like are made from being mixed because welding is performed while the portion to be welded and the divided conductors 11 abutting against each other. Further, fiber-laser welding is performed, and therefore, even if the conductor insulating layers 12 and the like exist around the abutting surfaces of the portion to be welded and the divided conductors 11, a component burned (volatilized) at the time of welding, such as the material from which the conductor insulating layers 12 are made, is not generally contained in the welded portion 15. Thus, even if the flat conductor 13 includes the conductor insulating layers 12 and the peripheral insulating layer 14 (around the divided conductors 11), it is possible to restrain soot and blowholes from being generated and remaining in the welded portions 15. In a case in which soot and blowholes can be restrained from remaining, the welded portion 15 shows high welding strength and preferably has tensile strength of, for example, 300 MPa or more. The tensile strength of the welded portion 15 can be measured by a measurement method described in examples below. In the present invention, contact surfaces between inner circumferential surfaces of the recessed portions to be welded and the flat conductor may also be heated and melted at the time of welding to thereby be formed as welded portions, and therefore the welding strength to the flat conductor is further improved, and, in addition, improvement in conductivity can also be expected. Thus, the welding member is not, for example, separated or detached from the flat conductor when the insulated wire material is subjected to coil processing or is TIG-welded to the terminal or the like or even after TIG welding, the insulated wire material 1 maintains a welding state and shows high reliability.

In a case in which a tin layer is formed in the welding member 16 or the flat conductor 13, the welded portion 15 contains tin (element) and, for example, is alloyed with copper or is dissolved in copper.

The welding member 16 (the portion to be welded) and the flat conductor 13 (the divided conductors 11) are welded (the welded portion 15 is formed) by performing fiber-laser welding by using a fiber-laser welding apparatus. In the present invention, fiber-laser welding may be heat-conductive laser welding, but is preferably deep penetration welding (keyhole welding).

The fiber-laser welding apparatus can be, for example, a fiber-laser welding apparatus "ASF1J23" (trade name, manufactured by Furukawa Electric Co., Ltd.) whose oscillation wavelength is 1084 nm (single mode oscillation laser beam), and a CW fiber laser of 500 W can be used. In welding, irradiation with laser beams is performed at a focused position by adjusting laser beam output to 300 to 500 W, sweep speed of laser beams to 50 to 250 mm/sec., and a spot diameter of a laser beam at a focus position to 20 μm. A laser beam irradiation position is preferably irradiated along the abutting surfaces. Note that the above-mentioned welding conditions are merely examples and are changed as appropriate depending on the number of divided conductors 11, a material thereof, or the like. For example, in welding of a wire precursor (an insulated wire) manufactured in examples described below and a welding member, the sweep speed of laser beams is set to 50 to 250 mm/sec in a case in which the laser beam output is set to 300 to 500 W. An irradiation direction of fiber laser beams is as described above and is a direction along the thickness direction of the portion to be welded from the outside of the portion to be welded (from the direction crossing the abutting surfaces, preferably from the vertical direction).

A fiber laser has a high energy density of lasers, and, in addition, can irradiate a narrow width of approximately 20 μm with lasers as to TIG welding in which the welded portion needs to have approximately 20 mm. Thus, it is possible to weld the welding member 16 and the flat conductor 13 with high welding strength (form the welded portions 15). Further, because the portions to be welded and the divided conductors 11 are welded while abutting against each other and because of the high energy density, it is possible to burn, at the time of welding, resin or the like from which the conductor insulating layers 12 and the peripheral insulating layer 14 are made. This can avoid occurrence of problems (reduction in welding strength and the like) caused by soot and blowholes generated and remaining at the time of welding. Further, by using a low centric lens system in the fiber laser, it is possible to reduce processing time, which is advantageous in mass-production.

In the insulated wire material of the present invention, instead of the flat conductor 13 formed by laminating ribbon wires serving as the divided conductors 11, it is also possible to use a flat conductor formed by molding strand wires (litz wires) into a flat shape, the strand wires being formed by twisting enameled element wires that are an example of coated element wires serving as the divided conductors. This flat conductor is a flat molded body of strand wires (flat litz wires) formed by enameled element wires.

Figure 9:
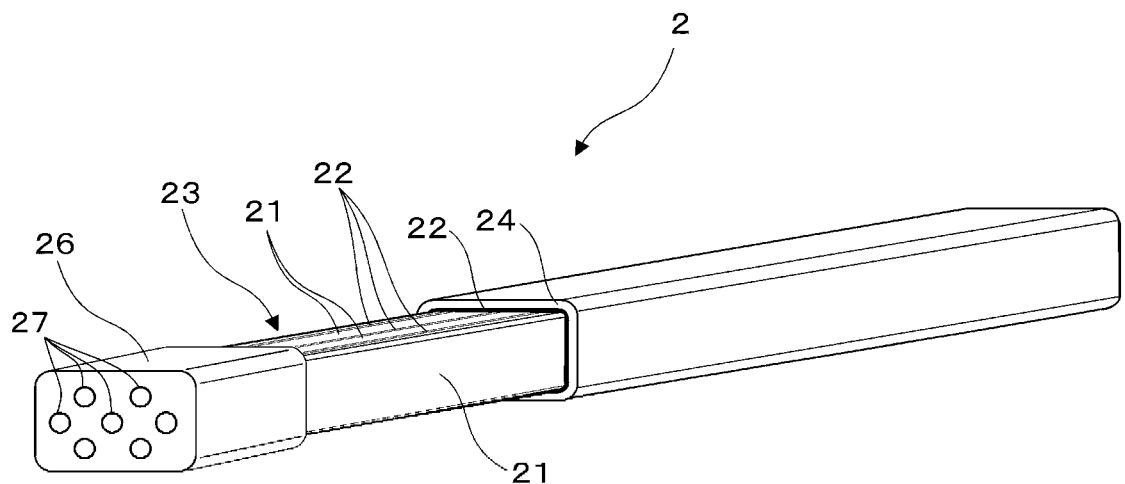
FIG. 9 is a schematic perspective view illustrating a state in which conductor insulating layers and a peripheral insulating layer are cut out in an example of another preferable embodiment of insulated wire material of the present invention.

An example of the insulated wire material including such the flat conductor is insulated wire material 2 illustrated in FIGS. 9 and 10. The insulated wire material 2 has the same configuration as the insulated wire material 1 other than a flat conductor 23. FIG. 9 illustrates the flat conductor 23 in which conductor insulating layers other than conductor insulating layers 22 sandwiched between adjacent divided conductors 21 are removed in order to illustrate a structure of the flat conductor 13 (cut-out diagram), and FIG. 10 illustrates a state in which the conductor insulating layers 22 with which peripheral surfaces of the divided conductors 21 are coated remain without being removed.

The flat conductor 23 included in the insulated wire material 2 is formed by molding, into a flat shape, strand wires in which a single enameled element wire (the divided conductor 21 having a peripheral surface coated with the conductor insulating layer 22) is placed to be surrounded by six enameled element wires. The flat conductor includes seven divided conductors 21 and the conductor insulating layers 22 sandwiched between at least adjacent divided conductors 21. Neither (the insulated wire material 2 including) such the flat conductor 23 or (the insulated wire material 1 including) the flat conductor 13 can be TIG-welded to the terminal or the like with sufficient strength.

The divided conductors before molding and after molding have the same configuration as the divided conductors 11 for use in the insulated wire material 1 other than the cross-sectional shape vertical to the axis and the dimensions. The divided conductors before molding have a circular cross-sectional shape. A cross-sectional shape and dimensions of the divided conductors 21 after molding are not unconditionally determined depending on the number of divided conductors 21, molding pressure, and the like and are not particularly limited as long as the divided conductors 21 have an approximately flat shape as a whole.

For the conductor insulating layers 22, insulating layers similar to the conductor insulating layers 12 can be used. The conductor insulating layers 22 only need to obtain an effect of reduction in eddy current loss, and therefore, in order to prevent the flat conductor 23 from being too thick, a thickness thereof is set to fall within the same range as the thickness of the conductor insulating layer 12.

In the present invention, the strand wires only need to be braided wires formed by twisting a plurality of enameled wires, and placement, a twisting direction, a twisting pitch, and the like of the enameled wires at the time of twisting the enameled wires can be set as appropriate depending on its use or the like.

Further, the flat conductor 23 can be manufactured by molding strand wires manufactured by a general manufacturing method into a flat shape. The method of molding strand wires only needs to be a forming method by which the strand wires can be molded into a flat shape and a condition therefor, and the method can be performed in the same way as a publicly-known method of molding flat strand wires (for example, compression molding, groove rolling).

A peripheral insulating layer 24 included in the insulated wire material 2 can be formed by an insulating layer similar to the peripheral insulating layer 14 included in the insulated wire material 1.

The insulated wire material 2, as well as the insulated wire material 1, includes a welding member 26 via a welded portion (not illustrated) at one end portion of the flat conductor 23. As illustrated in FIG. 9, the welding member 26 included in the insulated wire material 2 has seven recessed portions to be welded 27 so that the recessed portions to be welded 27 correspond to array of the divided conductors 21 constituting the flat conductor 23 (so that one recessed portion to be welded 27 abuts against each of the end surfaces of the divided conductors 21). The welding member 26 is the same as the welded portion 15 and the welding member 16 included in the insulated wire material 1, except that the number and array of the recessed portions to be welded 27 are different. In the welding member 26 for use in the insulated wire material 2, the number and array of the recessed portions to be welded 27 are not limited to the example illustrated in FIG. 9, and examples thereof encompass a welding member in which two or more recessed portions to be welded 27 are arrayed on one of the end surfaces of the divided conductors 21, a welding member in which the recessed portions to be welded 27 are arrayed on end surfaces of arbitrary two to six divided conductors 21, and the like.

The insulated wire material of the present invention can be a long insulated wire including a welding member connected to one end portion of a flat conductor via a welded portion, but is preferably a short insulated wire having a predetermined length and including welding members joined to both end portions of a flat conductor via welded portions. The length (whole length) of the short insulated wire is set as appropriate depending on its use or the like and can be, for example, 10 to 100 cm. Such the shot insulated wire is preferably used as a coil-mounting insulated wire for rotating electric machines.

Each of the pieces of the above-mentioned insulated wire material 1, 2, and 5A to 5C has excellent welding workability with another end portion (welding member) of the insulated wire material, the terminal, or the like and can be electrically connected by TIG welding that is generally employed in manufacturing insulated wires on site. In particular, the pieces of the insulated wire material 1 and 2 show the above-mentioned excellent characteristics while maintaining performance of reduction in eddy current loss. Note that, even if the welding member 16 and 26 are provided, those portions are not included in a coil portion and therefore do not inhibit the effect of reduction in eddy current loss.

Further, a coil including any of the pieces of the above-mentioned insulated wire material 1, 2, and 5A to 5C and electrical/electronic equipment including the coil have excellent welding workability in the insulated wire material of the coil.

[Method of Manufacturing Insulated Wire Material of the Present Invention]

The insulated wire material of the present invention can be manufactured by irradiating and welding the end surface of the above-mentioned conductor and the above-mentioned welding member in a state in which the end surface of the conductor and the portion to be welded of the welding member abut against each other, in particular, in a state in which the end surface of the conductor and a surface of the portion to be welded of the welding member (an opposite surface of the recessed portion to be welded, which faces the opening thereof) abut against each other so that the recessed portion to be welded is positioned on an extended line of the end surface of the single core conductor or divided conductors. The portion to be welded is irradiated with fiber lasers in the thickness direction of the portion to be welded from the outside thereof (the direction crossing the abutting surfaces, and preferably the vertical direction), specifically, in a direction from the opening of the recessed portion to be welded toward the bottom portion, while the above-mentioned state is being maintained.

A fiber-laser welding method and conditions are as described above in the description regarding welding of the welding member and the conductor (formation of the welded portion).

In the method of manufacturing the insulated wire material in the present invention, at an end portion of a wire precursor including the above-mentioned conductor and the above-mentioned peripheral insulating layer, the peripheral insulating layer does not need to be peeled or removed. However, the peripheral insulating layer may be peeled and removed if desired. As a method of peeling and removing (stripping) the peripheral insulating layer, a method that is generally used for stripping the insulated wire is applicable without being particularly limited. An aspect of peeling and removing the peripheral insulating layer is as described above in the description regarding the conductor.

In this way, it is possible to manufacture the insulated wire material of the present invention including the welding member provided at the end portion of the conductor and joined via the welded portion.

Although the insulated wire material of the present invention has the above-mentioned configuration, the insulated wire material can also be expressed as described below by focusing on the welding member.

That is, insulated wire material includes: one or a plurality of insulated wires including a conductor including a single core conductor including a single core conductor and a peripheral insulating layer with which a periphery of the conductor is coated; and a welding member including a portion to be welded to which an end portion of the single core conductor constituting the insulated wire is welded, in which at least one end portion of the conductor and the welding member are joined via a welded portion including an end portion of (at least one) single core conductor and the portion to be welded.

Further, insulated wire material includes: a flat conductor including a plurality of divided conductors placed in parallel to each other or helically placed and conductor insulating layers sandwiched between the divided conductors; a peripheral insulating layer with which a periphery of the flat conductor is coated; and a welding member including a portion to be welded to which end portions of the divided conductors constituting the flat conductor are welded, in which at least one end portion of the flat conductor and the welding member are joined via a welded portion including an end portion of (at least one) divided conductor and the portion to be welded.

The insulated wire material of the present invention is applicable to electrical/electronic equipment and is suitably applied to, for example, a wire for a telephone, a wire for a transformer, and a coil forming a motor for a hybrid automobile or electric automobile. For example, the insulated wire material can be used as a winding wire that forms a coil of a stator of a rotating electric machine (motor). A coil including the insulated wire material of the present invention or electrical/electronic equipment including the coil have an advantage in low eddy current loss also in a radio frequency range.

Further, the flat conductor 13 in which ribbon wires are laminated and the flat conductor 23 including flat litz wires have a rectangular (flat) cross-sectional shape. The conductor having a flat cross-sectional shape can increase a space factor in a slot of a stator core at the time of winding, as compared to a conductor having a circular cross-sectional shape, and contributes to improvement in performance.

Further, the pieces of the insulated wire material 1 and 2 restrain an increase in AC resistance caused by a skin effect and a proximity effect peculiar to a radio frequency and reduce a rise in temperature of the coil. With this, improvement in efficiency of the equipment, reduction in size thereof, energy saving thereof, and an increase in speed thereof are achieved.

[Coil, and Electrical/Electronic Equipment]

The insulated wire material of the present invention is applicable to a field which requires electrical properties (resistance to voltage) and heat resistance, such as various kinds of electrical/electronic equipment, as coil. For example, the insulated wire material of the present invention is used for a motor, a transformer and the like, which can compose high-performance electrical/electronic equipment. In particular, the insulated wire material is preferably used as a winding wire for a driving motor of hybrid vehicles (HV) and electric vehicles (EV). As descried above, according to the present invention, it is possible to provide the insulated wire material of the present invention as a coil, and an electrical/electronic equipment, in particular a driving motor of HV and EV, using the coil.

The coil of the present invention is not particularly limited, as long as it has a form suitable for various kinds of electrical/electronic equipment and examples thereof include items formed by a coil processing of the insulated wire material of the present invention, and items formed by making an electrical connection of prescribed parts (welding member 16) after subjecting the insulated wire material of the present invention to a bending processing.

The items formed by a coil processing of the insulated wire material of the present invention are not particularly limited and examples thereof include a roll formed by spirally winding around a long insulated wire material. In these coils, the winding wire number or the like of the insulated wire material is not particularly limited. Ordinarily, in winding around the insulated wire material, an iron core or the like is used.

Figure 11:
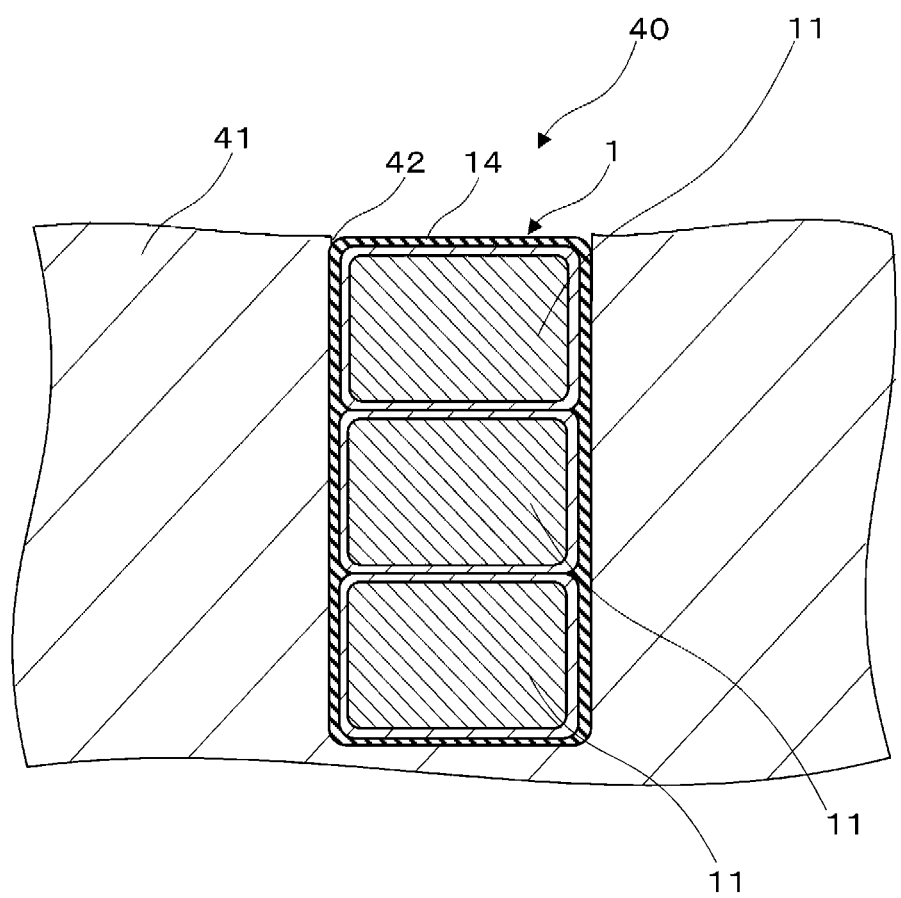
FIG. 11 is a schematic partial cross-sectional view illustrating an example of a preferable embodiment of a coil of the present invention.

For example, as illustrated in FIG. 11, a coil 40 is formed by winding the insulated wire material of the present invention (the insulated wire material 1 in FIG. 11) once or a plurality of times in a groove 42 formed in a core 41.

Figure 12:
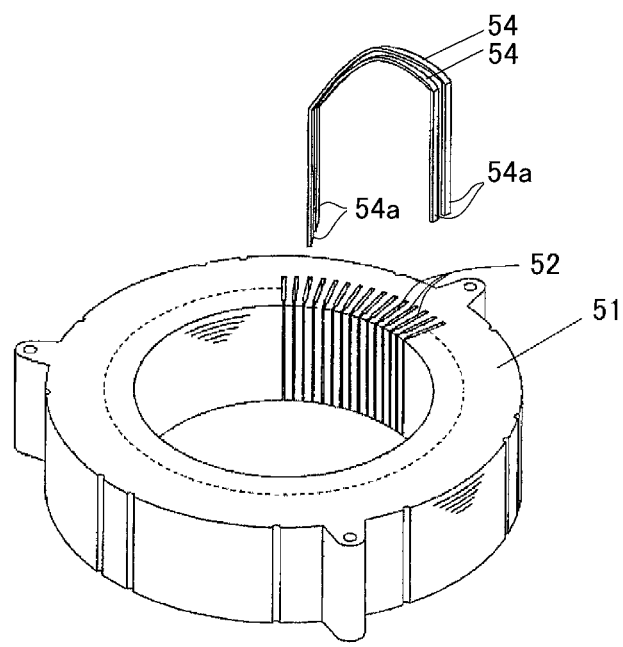
FIG. 12 is a schematic perspective exploded view illustrating an example of a preferable embodiment of a stator for use in electrical/electronic equipment of the present invention.
Figure 13:
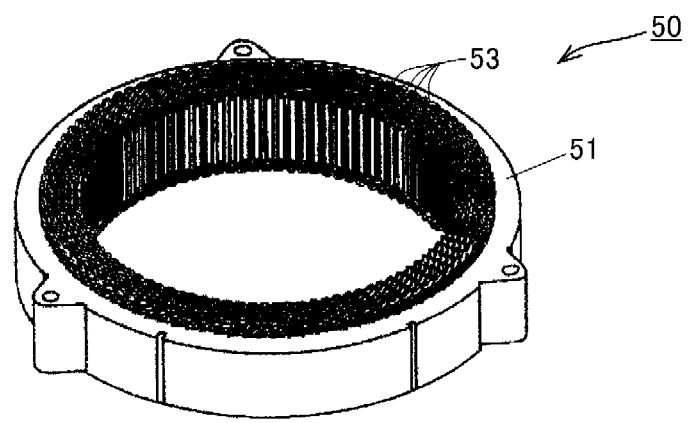
FIG. 13 is a schematic exploded perspective view illustrating an example of a preferable embodiment of a stator for use in electrical/electronic equipment of the present invention.

Example of the items formed by making an electrical connection of prescribed parts after subjecting the insulated wire material of the present invention to a bending processing include coils used in a stator for rotating electrical machines or the like. As illustrated in FIGS. 12 and 13, such the coil is, for example, a coil 53 (see FIG. 13) formed by bending, in a U-shaped form or the like, pieces of short insulated wire material each of which includes welding members at both end portions of a flat conductor, thereby preparing a plurality of wire segments 54, and then alternately connecting (welding) two open end portions (welding members) 54a in the U-shaped form or the like of each wire segment 54.

The electrical/electronic equipment formed by using this coil is not particularly limited and examples of one preferable embodiment of such electrical/electronic equipment include a rotating electric machine equipped with a stator 50 shown in FIG. 13 (in particular, driving motors of HV and EV). This rotating electric machine can be made in the same constitution as the conventional one, except for equipment of the stator 50.

The stator 50 can be made in the same constitution as the conventional one, except for its wire segment 54 (see FIG. 12) being formed by the insulated wire material (preferably the short insulated wire material) of the present invention. Specifically, the stator 50 has a stator core 51, and a coil 53 in which, as shown in such as FIG. 12, wire segments 54 formed of the insulated wire material of the present invention are incorporated in a slot 52 of the stator core 51 and open ends 54a of the wire segments 54 are electrically connected. Herein, the wire segment 54 may be incorporated in the slot 52 with one segment. However, it is preferable that as shown in FIG. 12, two segments are incorporated in pairs. In this stator 50, the coil 53 formed by alternately connecting the open ends 54a that are two ends of the wire segments 54 which have been subjected to a bending processing as described above, is incorporated in the slot 52 of the stator core 51. In this case, the wire segment 54 may be incorporated in the slot 52 after connecting the open ends 54a thereof. Alternatively, after incorporating the wire segment 54 in the slot 52, the open ends 54a of the wire segment 54 may be subjected to a bending processing, thereby to connect them.

The insulated wire material using the conductor having a rectangular cross-sectional shape allows, for example, increase in a ratio (space factor) of the cross-sectional area of the conductor to the slot cross-sectional area of the stator core, whereby properties of the electrical/electronic equipment can be improved.

EXAMPLES

The present invention will be described in more detail based on examples given below, but the invention is not meant to be limited by these.

Example 1

In the present example, an insulated wire material 1 illustrated in FIGS. 6 to 8 was produced as follows.

Specifically, the divided conductors 11 (see FIG. 7) including flat ribbon wires having a size of 3.66×0.70 mm (width×thickness) and having four corners chamfered at a radius of curvature of r=0.10 mm were prepared by using oxygen-free copper having an oxygen content of 20 ppm or less. The conductor insulating layers 12 were formed on the peripheries of the divided conductors 11 by using polyetherimide (PEI) serving as thermoplastic resin (see FIG. 6). In a case in which the conductor insulating layers 12 were formed, a PEI varnish was coated on the peripheries of the divided conductors 11 by using a die having a shape similar to the shape of the divided conductors 11. The divided conductors 11 to which the PEI varnish had been applied were caused to pass through a baking furnace having a length of 8 m and set at 450° C. at a speed to achieve a baking time of 15 seconds. The PEI varnish was prepared by dissolving PEI (manufactured by SABIC Innovative Plastics, trade name: ULTEM 1010) in N-methyl-2-pyrrolidone (NMP). In such a baking step, a polyetherimide layer having a thickness of 3 μm was formed. In this way, there was obtained the divided conductors 11 (enameled wires) whose peripheral surfaces were coated with the conductor insulating layers 12 having a film thickness of 3 μm.

Three divided conductors 11 coated with the conductor insulating layers 12 were laminated in the thickness direction, and thus the flat conductor 13 (see FIG. 8) was obtained. Then, on the periphery thereof, the peripheral insulating layer 14 (see FIG. 8) made from thermoplastic resin was formed by extrusion molding.

As a screw of an extruder, a screw having 30 mm full-flight, L/D=20, and a compassion ratio of 3 was used. As a cylinder temperature in the extruder, temperatures in three zones were set to 300° C., 380° C., and 380° C. in order from a resin introduction side. In addition, a temperature of a head portion was set to 390° C., and a temperature of a die portion was set to 400° C. As the thermoplastic resin of the peripheral insulating layer 14, polyetheretherketone (PEEK: manufactured by Solvay Specialty Polymers, trade name: KetaSpire KT-820, dielectric constant of 3.1, melting point of 343° C.) was used.

After polyetheretherketone was extruded and coated by using an extrusion die, the polyetheretherketone was left for ten seconds and was then water-cooled. Thereafter, the peripheral insulating layer 14 having a thickness of 50 μm was formed on the periphery of the flat conductor 13, and thus a wire precursor having a cross-sectional size of 3.76 mm (width)×2.22 mm (height) and a length of 19 cm was obtained.

Meanwhile, by casting molten metal of oxygen-free copper having an oxygen content of 20 ppm or less to a molding having predetermined dimensions, the rectangular parallelepiped welding member 16 having a length (height) of 10 mm and a cross-sectional size (side surface) of 3.76 mm (width)×2.22 mm (height) was prepared. The welding member 16 has nine recessed portions to be welded (bottomed holes) 17 that are open toward the above-mentioned side surface in an array of three rows and three lines corresponding to three layers of the divided conductors 11. Each recessed portion to be welded 17 was a bottomed hole having the following dimensions: a diameter of 1.0 mm×depth of 8.0 mm (thickness of portion to be welded of 2.0 mm). The area ratio [$S^{c1}$:$S^{c2}$] of the cross-sectional area $S^{c1}$ of the welding member 16 before welding to the cross-sectional area $S^{c2}$ of the flat conductor of the wire precursor (before fiber-laser welding) was 1:1.

Then, the end portion of the flat conductor of the wire precursor in which the peripheral insulating layer 14 and the conductor insulating layers 12 had not been removed and the opposite surface of the welding member, the opposite surface facing a surface in which the recessed portions to be welded 17 were open, were caused to abut against each other so that the (three) recessed portions to be welded 17 (provided side by side in the width direction) were positioned on the extended line of the axial direction of the end surface of each of the divided conductors 11 constituting the flat conductor 13. In this state, each portion to be welded was irradiated with fiber lasers under the following welding conditions in the thickness direction of the portion to be welded (vertical direction to the abutting surfaces) from the outside of the portion to be welded, i.e., in a direction from the openings of the recessed portions to be welded 17 toward the bottom portions thereof in the recessed portions to be welded 17.

In this way, the insulated wire material 1 provided with the welding member 16 having the whole length of 20 cm was prepared.

<Fiber-Laser Welding Conditions>

Laser welding apparatus: ASF1J23 (trade name, manufactured by Furukawa Electric Co., Ltd.), 500 W, CW fiber laser Laser beam output: 300 W Oscillation wavelength: 1084 nm (single mode oscillation laser beam)

Sweep speed: 50 mm/sec.

Spot diameter of laser beam at focus position: 20 μm

Laser beam irradiation with all conditions focused

Laser beam irradiation position: after the bottom portions of the recessed portions to be welded 17 were mainly irradiated, the recessed portions to be welded were straightly swept until laser beams reach circumferences of the recessed portions and were then swept along the circumferences once.

Examples 2~6

In each of Examples 2 to 6, the insulated wire material equipped with the welding member 16 was obtained in the same way as Example 1, except that the laser beam output and the sweep speed of laser beams were set to values shown in Table 1.

Example 7

The insulated wire material 2 to which the welding member 26 was welded, which was illustrated in FIGS. 9 and 10, was prepared.

Specifically, the flat conductor 23 (see FIG. 10) including flat litz wires was prepared. The flat conductor 23 was prepared by forming enameled layer (polyetherimide layers having a layer thickness of 3 μm) on peripheral surface of each of seven element wires made from oxygen-free copper (OFC), forming strand wires by using those seven element wires, and then processing the strand wires into a flat shape. Dimensions thereof were set to be the same as those of the divided conductors 11 used in Example 1.

By preparing the flat conductor as described above, the flat conductor 23 (see FIG. 10) including the flat litz wires was obtained, and, on a periphery thereof, the peripheral insulating layer 24 (see FIG. 10) made from thermoplastic resin was formed by extrusion molding.

As a screw of an extruder, a screw having 30 mm full-flight, L/D=20, and a compassion ratio of 3 was used. As a cylinder temperature in the extruder, temperatures in three zones were set to 300° C., 380° C., and 380° C. in order from a resin introduction side. In addition, a temperature of a head portion was set to 390° C., and a temperature of a die portion was set to 400° C. As the thermoplastic resin of the peripheral insulating layer 24, polyetheretherketone (PEEK: manufactured by Solvay Specialty Polymers, trade name: KetaSpire KT-820, dielectric constant of 3.1, melting point of 343° C.) was used.

After polyetheretherketone was extruded and coated by using an extrusion die, the polyetheretherketone was left for ten seconds and was then water-cooled. Thereafter, the peripheral insulating layer 24 having a thickness of 50 μm was formed on the periphery of the flat conductor 23, and thus a wire precursor having a cross-sectional size of 3.76 mm (width)×2.22 mm (height) and a length of 19 cm was obtained.

Meanwhile, the welding member 16 prepared in Example 1 was prepared as the welding member 26. However, placement of the recessed portions to be welded 27 was set to the placement illustrated in FIG. 9.

The above-mentioned flat conductor and the above-mentioned wire precursor thus prepared were fiber-laser welded in the same way as Example 1, thereby forming the welded portion 25. Thus, the insulated wire material 2 equipped with the welding member 26 having the whole length of 20 cm was prepared.

Examples 8~12

In each of Examples 8~12, the insulated wire material 2 equipped with the welding member 26 was obtained in the same way as Example 7, except that the laser beam output and the sweep speed of laser beams were set to values shown in Table 1.

Examples 13~18

In Example 13, the insulated wire material 1 equipped with the welding member 16 was obtained in the same way as Example 1, except that the opposite surface of the welding member, the opposite surface facing the surface in which the recessed portions to be welded 27 were open, was plated with a tin layer having a thickness of 1 μm was used.

In each of Examples 14 to 18, the insulated wire material 1 equipped with the welding member 16 was obtained in the same way as Example 13, except that the laser beam output and the sweep speed of laser beams were set to values shown in Table 1.

Examples 19~24

In Example 19, the insulated wire material 2 equipped with the welding member 26 was obtained in the same way as Example 7, except that the opposite surface of the welding member, the opposite surface facing the surface in which the recessed portions to be welded 27 were open, was plated with a tin layer having a thickness of 1 μm was used.

In each of Examples 20 to 24, the insulated wire material 2 equipped with the welding member 26 was obtained in the same way as Example 19, except that the laser beam output and the sweep speed of laser beams were set to values shown in Table 1.

Comparison Example 1

In this example, insulated wire material was manufactured by using the wire precursor prepared in Example 1 and a rectangular parallelepiped welding member (solid body) having no recessed portion to be welded.

That is, a rectangular parallelepiped welding member having a cross-sectional size of 3.76 mm (width)×2.22 mm (height) and having a length of 10 mm was prepared by using oxygen-free copper having an oxygen content of 20 ppm or less. Then, in a state in which the end surface of the flat conductor of the wire precursor and the end surface of the welding member abutted against each other, those abutting surfaces were irradiated with fiber laser beams along an abutting position from a direction vertical to the axis of the flat conductor with respect to the abutting surfaces (a direction parallel to the abutting surfaces) to perform penetration welding. Fiber-laser welding conditions were the same as those in Example 1 other than the irradiation direction of fiber laser beams (laser beam irradiation position).

In this way, the insulated wire material provided with the welding member having the whole length of 20 cm was prepared.

Comparison Example 2

The insulated wire material equipped with the welding member was obtained in the same way as Comparison Example 1, except that the laser beam output and the sweep speed of laser beams were set to values shown in Table 1.

Comparison Example 3

In this example, insulated wire material was manufactured by using the wire precursor prepared in Example 7 and a rectangular parallelepiped welding member (solid body) having no recessed portion to be welded. That is, the wire precursor prepared in Example 7 and the welding member prepared in Comparison Example 1 were caused to abut against each other, and abutting surfaces thereof were fiber-laser welded in the same way as Comparison Example 1. Thus, insulated wire material equipped with a welding member having the whole length of 20 cm was prepared.

Comparison Example 4

The insulated wire material equipped with the welding member was obtained in the same way as Comparison Example 3, except that the laser beam output and the sweep speed of laser beams were set to values shown in Table 1.

Comparison Example 5

In this example, insulated wire material was manufactured by using the wire precursor prepared in Example 1 and the rectangular parallelepiped welding member prepared in Comparison Example 1 (end surface to be caused to abut against the end surface of the flat conductor had been plated). That is, the wire precursor prepared in Example 1 and the above-mentioned plated welding member were caused to abut against each other, and abutting surfaces thereof were fiber-laser welded in the same way as Comparison Example 1. Thus, the insulated wire material equipped with the welding member having the whole length of 20 cm was prepared.

Comparison Example 6

The insulated wire material equipped with the welding member was obtained in the same way as Comparison Example 5, except that the laser beam output and the sweep speed of laser beams were set to values shown in Table 1.

Comparison Example 7

In this example, insulated wire material was manufactured by using the wire precursor prepared in Example 7 and the rectangular parallelepiped welding member prepared in Comparison Example 1 (end surface to be caused to abut against the end surface of the flat conductor had been plated). That is, the wire precursor prepared in Example 7 and the above-mentioned plated welding member were caused to abut against each other, and abutting surfaces thereof were fiber-laser welded in the same way as Comparison Example 1. Thus, the insulated wire material equipped with the welding member having the whole length of 20 cm was prepared.

Comparison Example 8

The insulated wire material equipped with the welding member was obtained in the same way as Comparison Example 7, except that the laser beam output and the sweep speed of laser beams were set to values shown in Table 1.

The pieces of the insulated wire material in Examples 1 to 24 and Comparison Examples 1 to 8 manufactured as described above were evaluated as follows. Evaluation results thereof were shown in Table 1.

<Measurement of Welding Strength Between Flat Conductor and Welding Member>

Three pieces of insulated wire material corresponding to the insulated wire material in each example or comparison example were prepared in the same way as the example or comparison example, and, as to the three pieces of insulated wire material, tensile testing was performed in conformity with JIS Z 2241:2011 while flat conductors and welding members were being held, thereby measuring strength of welded portions. Then, an average value thereof was calculated and was defined as tensile strength of the insulated wire material.

In a case in which the tensile strength was 300 MPa or more, it was determined that the flat conductor and the welding member were firmly welded to such an extent that the welding member did not separate from the flat conductor at the time of coil processing or TIG welding to the terminal or the like, and thus welding strength was evaluated as "G". Meanwhile, in a case in which the tensile strength was less than 300 MPa, it was determined that the welding strength was insufficient, and thus the welding strength was evaluated as "N". Evaluation "G" means pass.

<Validation Test of Presence/Absence of Blowholes>

A cross-section of the welded portion was obtained by performing cross-section exposure while targeting a center of a melted portion. The welded portion in the cross-section was observed by an optical microscope, and the number of blowholes having a diameter of 0.1 mm or more was counted.

In a case in which the number of blowholes was ten or less and the flat conductor and the welding member were subjected to welding (a welded portion was formed), it was determined that fiber-laser weldability (simply referred to as "weldability" in the examples) was excellent, and the welded portion was graded "G", i.e., pass. Meanwhile, in a case in which the number of blowholes exceeded ten or welding was not performed, it was determined that weldability was inferior, and the welded portion was graded "N", i.e., failure.

<Validation Test of Presence/Absence of Soot>

In each piece of the insulated wire material, generation or remaining of soot in the welded portion was visually observed.

A case in which generation and remaining of black soot were not found in the vicinity of a welded part was graded "○", and a case in which generation and remaining of black soot were found in the vicinity of the welded part (failure) was graded "×".

The pieces of the insulated wire material in Examples 1 to 24, Comparison Examples 1 to 8, Example 25, and Comparison Example 9 were evaluated as follows. Evaluation results thereof were shown in Table 2.

<Welding Strength Test Between Welding Member and Terminal>

Each of the welding members of the pieces of the insulated wire material prepared in Examples 1 to 24 and Comparison Examples 1 to 8 and a terminal were TIG-welded.

Further, as Example 25, by using the insulated wire material (equipped with the welding member) manufactured in Example 11, the welding member of the insulated wire material and a terminal were fiber-laser welded under the following conditions for the terminal.

Further, as Comparison Example 9, the wire precursors (divided conductors) manufactured in Examples 1 and 7, from which the peripheral insulating layer and the conductor insulating layers had been removed, and a terminal were TIG-welded by the following method under the following conditions.

As the terminal, a flat conductor made from oxygen-free copper (OFC) and having a cross-sectional size of 3.76 mm (width)×2.22 mm (height) was used. Various terminals or the like may be mounted. However, as the terminal, a terminal equivalent to the above-mentioned welding member was used in all cases in this test.

Welding was performed in a state in which the bottom surfaces of the recessed portions to be welded of the welding member or the end surface of the welding member and an end surface of the terminal abutted against each other.

—TIG Welding Method and Conditions—

In TIG welding, argon was used as inert gas, and the argon was supplied to the welded portion at 12.0 L/min, and, in addition, a tungsten bar having a diameter of 3.2 mm was used as a welding bar. Further, TIG welding was performed under conditions of a current value of 190 A and energizing time of 0.1 seconds.

—Fiber-Laser Welding Conditions—

Laser welding apparatus: ASF1J23 (trade name, manufactured by Furukawa Electric Co., Ltd.), 500 W, CW fiber laser Laser beam output: 300 W Oscillation wavelength: 1084 nm (single mode oscillation laser beam)

Sweep speed: 100 mm/sec.

Spot diameter of laser beam at focus position: 20 μm

Laser beam irradiation with all conditions focused

Laser beam irradiation position: irradiate the abutting surfaces along an abutting position from the direction vertical to the axis of the flat conductor A sample in which each insulated wire material and the terminal had been welded as described above was subjected to tensile testing in conformity with JIS Z 2241:2011, and, in a case in which measured tensile strength was 300 MPa or more, it was determined that the flat conductor and the welding member were firmly welded to such an extent that the end portion of the welding member or the flat wire did not separate from the terminal, and the tensile strength was graded "G". Meanwhile, in a case in which the tensile strength was less than 300 MPa, it was determined that the welding strength was insufficient, and the tensile strength was graded "N". Evaluation "G" means pass.

TABLE 1

| | Material of the end surface of the welding member | recessed portions to be welded | Laser beam irradiation (against the Abutting surfaces) | Divided conductors |
|---|---|---|---|---|
| Example 1 | Cu | Formed | Vertical | 3 layers |
| Example 2 | | Formed | Vertical | laminated |
| Example 3 | | Formed | Vertical | |
| Example 4 | | Formed | Vertical | |
| Example 5 | | Formed | Vertical | |
| Example 6 | | Formed | Vertical | |
| Example 7 | | Formed | Vertical | Strand |
| Example 8 | | Formed | Vertical | wires of |
| Example 9 | | Formed | Vertical | 7 element |
| Example 10 | | Formed | Vertical | wires |
| Example 11 | | Formed | Vertical | |
| Example 12 | | Formed | Vertical | |

| | Laser welding conditions | | | | |
|---|---|---|---|---|---|
| | Laser beam output (W) | Sweep speed (mm/sec.) | weldability | Soot generation | Welding Strength test |
| Example 1 | 300 | 50 | ○ | ○ | G |
| Example 2 | | 150 | ○ | ○ | G |
| Example 3 | | 250 | ○ | ○ | G |
| Example 4 | 500 | 50 | ○ | ○ | G |
| Example 5 | | 150 | ○ | ○ | G |
| Example 6 | | 250 | ○ | ○ | G |
| Example 7 | 300 | 50 | ○ | ○ | G |
| Example 8 | | 150 | ○ | ○ | G |
| Example 9 | | 250 | ○ | ○ | G |

TABLE 1-continued

| | | | | | |
|---|---|---|---|---|---|
| Example 10 | 500 | 50 | ○ | ○ | G |
| Example 11 | | 150 | ○ | ○ | G |
| Example 12 | | 250 | ○ | ○ | G |

| | Material of the end surface of the welding member | recessed portions to be welded | Laser beam irradiation (against the Abutting surfaces) | Divided conductors |
|---|---|---|---|---|
| Example 13 | Tin plating layer/Cu | Formed | Vertical | 3 layers laminated |
| Example 14 | | Formed | Vertical | |
| Example 15 | | Formed | Vertical | |
| Example 16 | | Formed | Vertical | |
| Example 17 | | Formed | Vertical | |
| Example 18 | | Formed | Vertical | |
| Example 19 | | Formed | Vertical | Strand wires of 7 element wires |
| Example 20 | | Formed | Vertical | |
| Example 21 | | Formed | Vertical | |
| Example 22 | | Formed | Vertical | |
| Example 23 | | Formed | Vertical | |
| Example 24 | | Formed | Vertical | |

| | Laser welding conditions | | | | |
|---|---|---|---|---|---|
| | Laser beam output (W) | Sweep speed (mm/sec.) | weldability | Soot generation | Welding Strength test |
| Example 13 | 300 | 50 | ○ | ○ | G |
| Example 14 | | 150 | ○ | ○ | G |
| Example 15 | | 250 | ○ | ○ | G |
| Example 16 | 500 | 50 | ○ | ○ | G |
| Example 17 | | 150 | ○ | ○ | G |
| Example 18 | | 250 | ○ | ○ | G |
| Example 19 | 300 | 50 | ○ | ○ | G |
| Example 20 | | 150 | ○ | ○ | G |
| Example 21 | | 250 | ○ | ○ | G |
| Example 22 | 500 | 50 | ○ | ○ | G |
| Example 23 | | 150 | ○ | ○ | G |
| Example 24 | | 250 | ○ | ○ | G |

| | Material of the end surface of the welding member | recessed portions to be welded | Laser beam irradiation (against the Abutting surfaces) | Divided conductors |
|---|---|---|---|---|
| Comparison Example 1 | Cu | Not formed | Parallel | 3 layers laminated |
| Comparison Example 2 | | Not formed | Parallel | |
| Comparison Example 3 | | Not formed | Parallel | Strand wires of 7 element wires |
| Comparison Example 4 | | Not formed | Parallel | |
| Comparison Example 5 | Tin plating layer/Cu | Not formed | Parallel | 3 layers laminated |
| Comparison Example 6 | | Not formed | Parallel | |
| Comparison Example 7 | | Not formed | Parallel | Strand wires of 7 element wires |
| Comparison Example 8 | | Not formed | Parallel | |

| | Laser welding conditions | | | | |
|---|---|---|---|---|---|
| | Laser beam output (W) | Sweep speed (mm/sec.) | weldability | Soot generation | Welding Strength test |
| Comparison Example 1 | 300 | 50 | ○ | X | N |
| Comparison Example 2 | 500 | 250 | X | ○ | N |
| Comparison Example 3 | 300 | 50 | ○ | X | N |
| Comparison Example 4 | 500 | 250 | X | ○ | N |
| Comparison Example 5 | 300 | 50 | ○ | X | N |
| Comparison Example 6 | 500 | 250 | X | ○ | N |
| Comparison Example 7 | 300 | 50 | ○ | X | N |
| Comparison Example 8 | 500 | 250 | X | ○ | N |

TABLE 2

| | Welding members of the insulated wire material | Material of the terminal | Method of welding | Welding strength |
|---|---|---|---|---|
| Examples 1 to 24 | Welding member | Cu | TIG welding | G |
| Comparison Examples 1 to 8 | Welding member | Cu | TIG welding | G |
| Comparison Example 9 | Wire precursors (Flat conductor) | Cu | TIG welding | N |
| Example 25 | Welding member | Cu | Fiber-laser welding | G |

The followings are found from Tables 1 and 2.

That is, in Comparison Example 9 serving as a conventional welding process method, in which the wire precursor (to which the welding member was not welded) obtained by removing the peripheral insulating layer and the conductor insulating layers from the insulated wire material and the terminal were TGI-welded, in a case in which any one of the wire precursors manufactured in Examples 1 and 7 was used as the wire precursor, the wire precursor and the terminal could be welded, but welding strength was low, and welding workability with the terminal or the like was inferior (Table 2).

Further, the insulated wire material including the welding member manufactured in each of Comparison Examples 1 to 8 was obtained by irradiating abutting surfaces with laser beams along the abutting position from the direction parallel to the abutting surfaces under specified conditions and welding the flat conductor and the welding member. All the pieces of the insulated wire material cannot restrain soot or blowholes from being generated or remaining, and therefore penetration welding could not be performed, or, even if penetration welding could be performed, welding strength was insufficient. Thus, although the welding member and the terminal could be TIG-welded, there was a concern about separation, detachment, and the like between the welding member and the flat conductor, and therefore not only the welding workability but also reliability was inferior.

On the contrary, in any of Examples 1 to 24, even if the peripheral insulating layer and the conductor insulating layers have not been peeled or removed, it is possible to restrain soot and blowholes from being generated or remaining and achieve firm welding. Further, the tensile strength is generally high in the insulated wire material using the flat conductors each of which has the peripheral surface on which a tin layer is formed. Further, as shown in Table 2, the welding member provided in each of the pieces of the insulated wire material in Examples 1 to 24 and the terminals can be welded by TIG welding with high welding strength. As described above, in each of the pieces of insulated wire material in the examples, the welding member and the terminal can be TIG-welded, and the welding member and the flat conductor are subjected to firm welding and are therefore prevented from being, for example, separated or detached from each other. As a result, the insulated wire material has not only excellent welding workability with the terminal or the like but also excellent reliability.

From the above results, it is found that each of the pieces of the insulated wire material in Examples 1 to 24 has excellent welding workability with another end portion of the insulated wire material, the terminal, or the like and can be electrically connected by TIG welding.

From the above-mentioned results, it is found that, even in a case in which the insulated wires including a conductor including a single core conductor and a peripheral insulating layer with which a periphery thereof is coated are used in the same number as the number of the divided conductors instead of the above-mentioned wire precursor including the divided conductors, the single core conductor of the insulated wires, as well as the above-mentioned wire precursor including the divided conductors, can be fiber-laser welded to the welding member.

Further, in a case in which each of the pieces of the insulated wire material in Examples 1 to 24 was applied to a coil, it was also confirmed that eddy current loss was reduced as a radio frequency characteristic because the flat conductor 13 was the divided conductors 11 including three ribbon wires or the flat conductor 13 including flat litz wires.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2018-067210 filed in Japan on Mar. 30, 2018, which is entirely herein incorporated by reference.

REFERENCE SIGNS LIST 1, 2, 5A, 5B, 5C Insulated wire material
11, 21 Divided conductor
12, 22 Conductor insulating layer
13, 23 (divided) Conductor
14, 24, 34 Peripheral insulating layer
15, 25, 35A, 35B, 35C Welded Portion
16, 26, 36A, 36B, 36C, 36D Welding member
161 End surface
17, 27, 37A, 37B Recessed portions to be welded
38 Insulated wire
40 Coil
41 Core
42 Groove
50 Stator
51 Stator core
52 Slot
53 Coil
54 Wire segment
54a Open end portion (Welding member)

The invention claimed is:

1. An insulated wire material, including:
a conductor, wherein the conductor is:
a single core conductor having a peripheral insulating layer with which a periphery of the single core conductor is coated; or
a plurality of divided conductors placed in parallel to each other or helically placed having a respective conductor insulating layer sandwiched between the divided conductors, and having a peripheral insulating layer with which a periphery of the plurality of divided conductors is coated; and
a welding member provided at at least one end portion of the conductor and joined, via a welded portion welded to an end surface in the axial direction of the conductor, to at least a peripheral surface of the welded portion, the welding member having one or a plurality of bottomed holes each respectively having an opening on an opposite surface against a surface of the welding member with which the end surface of the conductor faces, the welded portion is at a position contacting and facing the conductor and in the one or the plurality of bottomed holes of the welding member,
wherein the welding member and the conductor are made of a same material, and
wherein the welding member is welded to the conductor by melting, by irradiating with fiber laser beams, and solidifying the welded portion at the position contacting and facing the conductor to form the one or the plurality of bottomed holes.

2. The insulated wire material according to claim 1, wherein the conductor includes the single core conductor.

3. The insulated wire material according to claim 2, in which the conductor includes a conductor insulating layer with which a peripheral surface of the single core conductor is coated and the conductor insulating layer is further coated with the peripheral insulating layer.

4. The insulated wire material according to claim 3, in which the conductor insulating layer is made from organic polymers.

5. The insulated wire material according to claim 3, in which the conductor insulating layer is an insulating layer having has cells.

6. The insulated wire material according to claim 2, in which the single core conductor is flat conductor.

7. The insulated wire material according to claim 2, in which a material of the single core conductor is oxygen-free copper.

8. The insulated wire material according to claim 7, in which the welded portion contains a tin element.

9. The insulated wire material according to claim 2, in which a material of the welding member is oxygen-free copper.

10. The insulated wire material according to claim 2, in which tensile strength of the welded portion is equal to or more than 300 MPa.

11. The insulated wire material according to claim 2, in which the peripheral insulating layer of the single core conductor is made from polyetheretherketone.

12. The insulated wire material according to claim 2, in which an area ratio [$S^{c1}:S^{c2}$] of a cross-sectional area $S^{c1}$ of the welding member before welding to a cross-sectional area $S^{c2}$ of the conductor before welding satisfies a range of 1:0.8 to 1.2.

13. A coil including the insulated wire material according to claim 2.

14. An electrical/electronic equipment, including the coil according to claim 13.

15. A coil including a plurality of pieces of the insulated wire material according to claim 2, wherein each of the pieces includes the welding member, wherein the welding members are electrically connected to each other.

16. A method of manufacturing the insulated wire material according to claim 2, including in a state in which the end surface of the conductor and a portion to be welded of the welding member abut against each other, irradiating the portion to be welded with fiber lasers of the fiber laser beams in a thickness direction of the portion to be welded and welding the end surface and the welding member.

17. The insulated wire material according to claim 1, wherein the conductor includes the plurality of divided conductors.

18. The insulated wire material according to claim 17, in which the divided conductors are flat conductors.

19. The insulated wire material according to claim 17, in which each of the plurality of divided conductors is a ribbon wire.

20. The insulated wire material according to claim 17, in which each of the plurality of divided conductors is an enameled wire, and the conductor is a flat molded body of strand wires including the enameled wires.

21. The insulated wire material according to claim 17, in which a material of the divided conductors is oxygen-free copper.

22. The insulated wire material according to claim 21, in which the welded portion contains a tin element.

23. The insulated wire material according to claim 17, in which a material of the welding member is oxygen-free copper.

24. The insulated wire material according to claim 17, in which tensile strength of the welded portion is equal to or more than 300 MPa.

25. The insulated wire material according to claim 17, in which the peripheral insulating layer of the plurality of divided conductors is made from polyetheretherketone.

26. The insulated wire material according to claim 17, in which the conductor insulating layer is made from organic polymers.

27. The insulated wire material according to claim 17, in which the conductor insulating layer has cells.

28. The insulated wire material according to claim 17, in which an area ratio $[S^{c1}:S^{c2}]$ of a cross-sectional area $S^{c1}$ of the welding member before welding to a cross-sectional area $S^{c2}$ of the conductor before welding satisfies a range of 1:0.8 to 1:1.2.

29. A coil including the insulated wire material according to claim 17.

30. An electrical/electronic equipment, including the coil according to claim 29.

31. A coil including a plurality of pieces of the insulated wire material according to claim 17, in which each of the plurality of pieces of the insulated wire material includes the welding member, the welding members of the plurality of pieces of the insulated wire material being electrically connected to each other.

32. A method of manufacturing the insulated wire material according to claim 17, including in a state in which the end surface of the conductor and a portion to be welded of the welding member abut against each other, irradiating the portion to be welded with fiber lasers of the fibers laser beams in a thickness direction of the portion to be welded and welding the end surface and the welding member.

* * * * *